US009875316B2

(12) United States Patent
Yamahara

(10) Patent No.: US 9,875,316 B2
(45) Date of Patent: Jan. 23, 2018

(54) IDENTIFYING USER SELECTION USING COORDINATES AND SNAPSHOTS OF WEBPAGES

(71) Applicant: Rakuten, Inc., Tokyo (JP)

(72) Inventor: Hisanori Yamahara, Tokyo (JP)

(73) Assignee: Rakuten, Inc., Setagaya-Ku, Tokyo (JP)

( * ) Notice: Subject to any disclaimer, the term of this patent is extended or adjusted under 35 U.S.C. 154(b) by 240 days.

(21) Appl. No.: 14/407,122

(22) PCT Filed: Nov. 28, 2013

(86) PCT No.: PCT/JP2013/082003
§ 371 (c)(1),
(2) Date: Dec. 11, 2014

(87) PCT Pub. No.: WO2015/079527
PCT Pub. Date: Jun. 4, 2015

(65) Prior Publication Data
US 2016/0275200 A1 Sep. 22, 2016

(51) Int. Cl.
*G06F 17/30* (2006.01)
*G06F 3/0484* (2013.01)
*G06F 17/22* (2006.01)
*G06T 1/00* (2006.01)
*G06T 7/73* (2017.01)

(52) U.S. Cl.
CPC .... *G06F 17/30899* (2013.01); *G06F 3/04842* (2013.01); *G06F 17/2205* (2013.01); *G06F 17/2247* (2013.01); *G06T 1/0007* (2013.01); *G06T 7/74* (2017.01)

(58) Field of Classification Search
CPC . G06F 17/24; G06F 17/30899; G06F 3/04842
See application file for complete search history.

(56) References Cited

U.S. PATENT DOCUMENTS 6,978,418 B1 * 12/2005 Bain ................ G06F 17/30899
707/E17.119

OTHER PUBLICATIONS

David Walsh, "Poll: Should Browsers Implement Lazy Loading?", David Walsh Blog, <http://davidwalsh.name/poll-lazy-loading>, Published prior to: Aug. 3, 2009.*
Tali Garsiel et al., "How Browsers Work: Behind the scenes of modern web browsers",Aug. 2, 2011, http ://www.html5rocks. com/ en/tutorials/internals/howbrowserswork/, pulled Nov. 20, 2014.

* cited by examiner

*Primary Examiner* — Stephen Hong
*Assistant Examiner* — Broderick Anderson
(74) *Attorney, Agent, or Firm* — Sughrue Mion, PLLC

(57) ABSTRACT

Even when it takes time to perform rendering of a web page, it is made possible to execute a process intended by a user who performs an operation of pointing at an element in the web page. When an operation of pointing at a position of an element in a web page is received before drawing of the web page is completed, an information processing apparatus acquires coordinates indicating the position and a screen shot of the web page. The information processing apparatus identifies an element indicated by an image, in the screen shot, located at a position indicated by the coordinates. When a process corresponding to an event of the operation is to be executed, the information processing apparatus causes a process that is executed when the operation is performed on the identified element to be executed.

10 Claims, 15 Drawing Sheets

STORE SCREEN SHOT CORRESPONDING TO TIMING OF POINTING AND POINTED COORDINATES

EXECUTE PROCESS CORRESPONDING TO POINTING OPERATION EVENT OF ELEMENT LOCATED AT STORED COORDINATES IN SCREEN SHOT

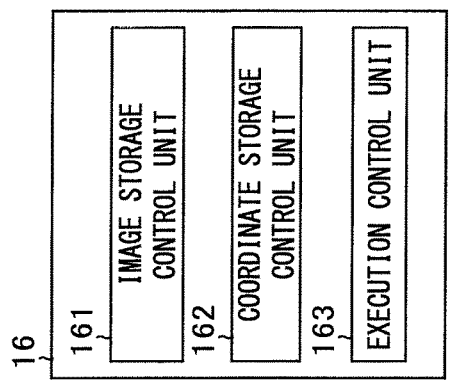
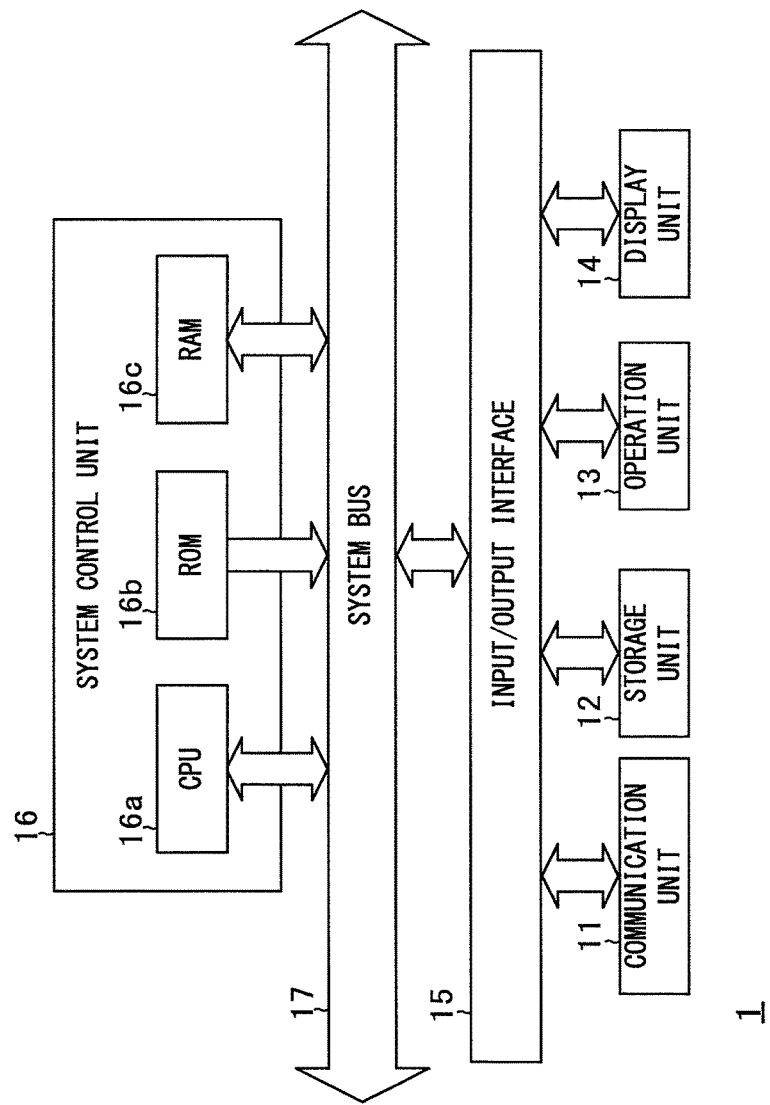

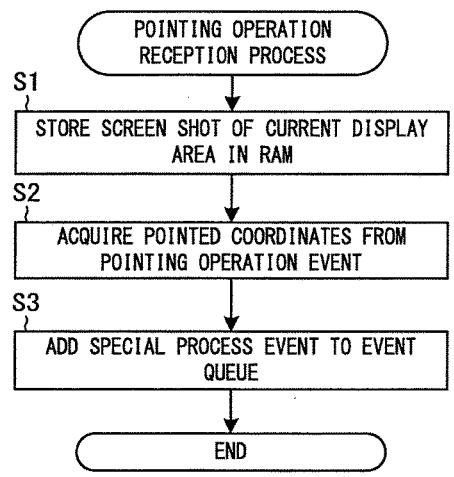
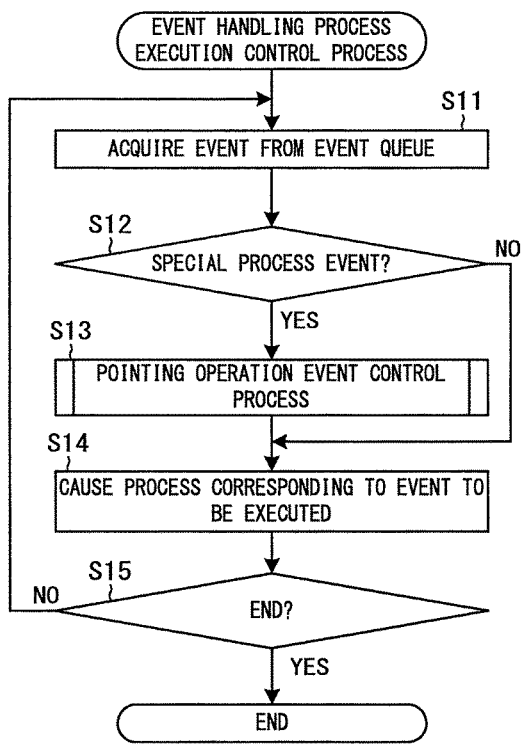
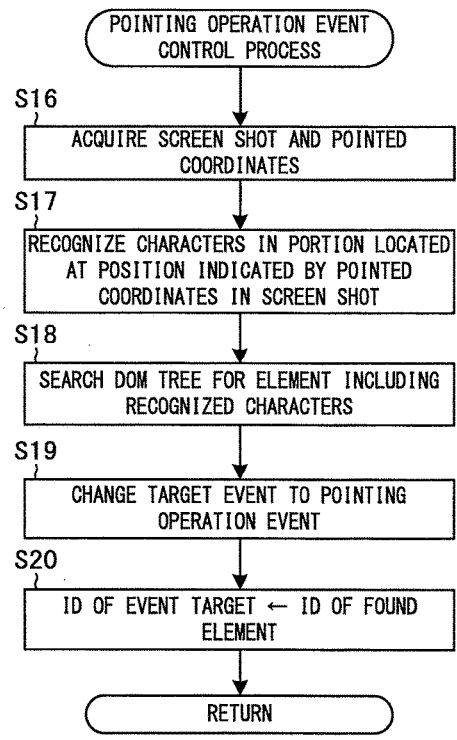

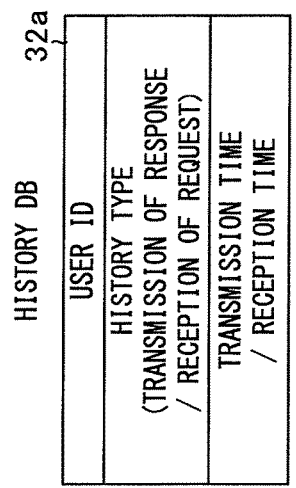
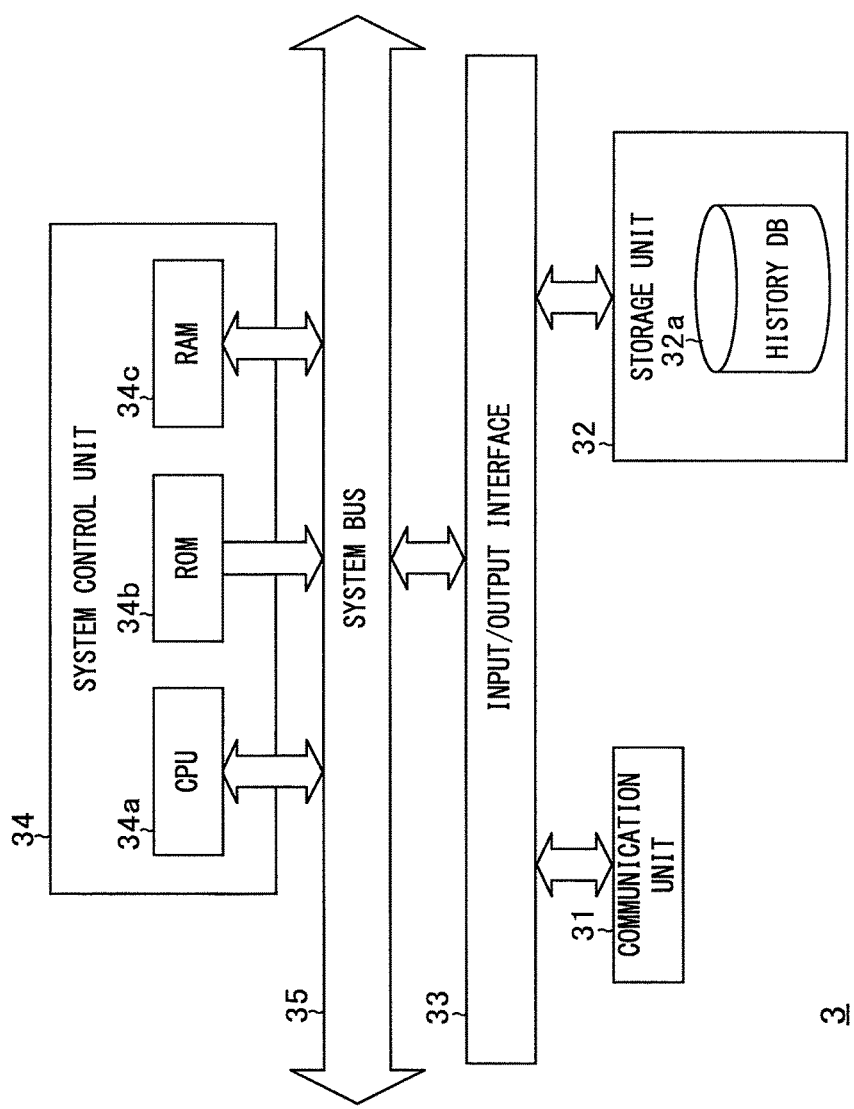

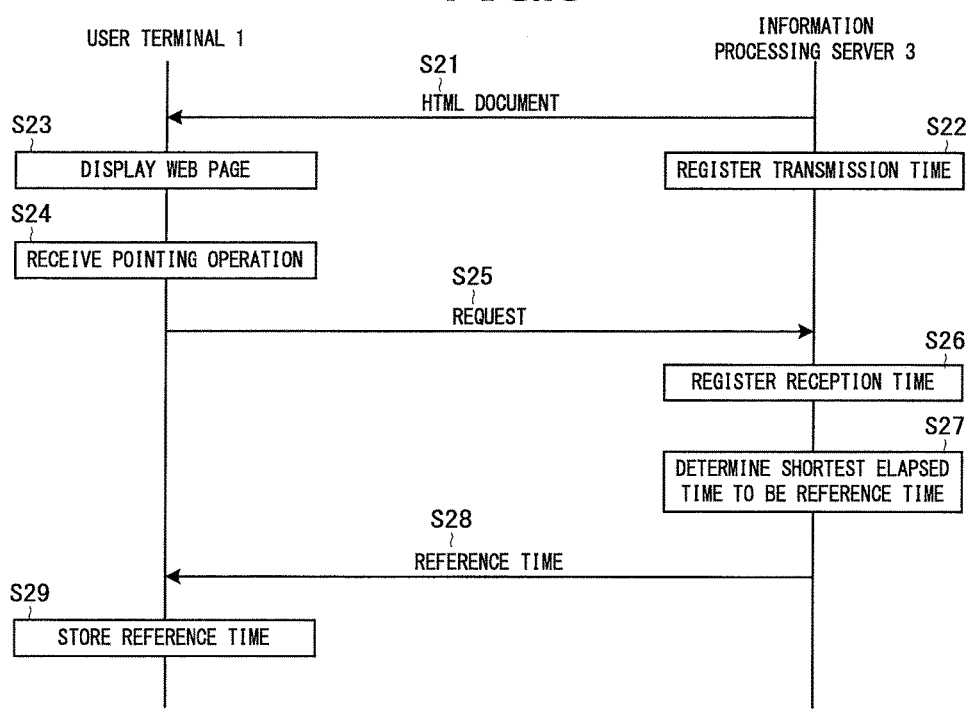

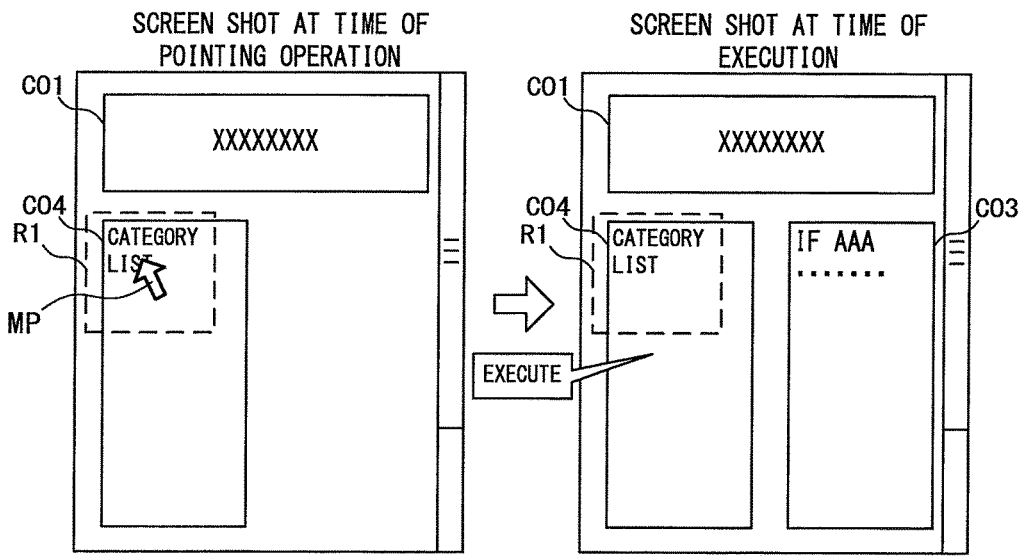
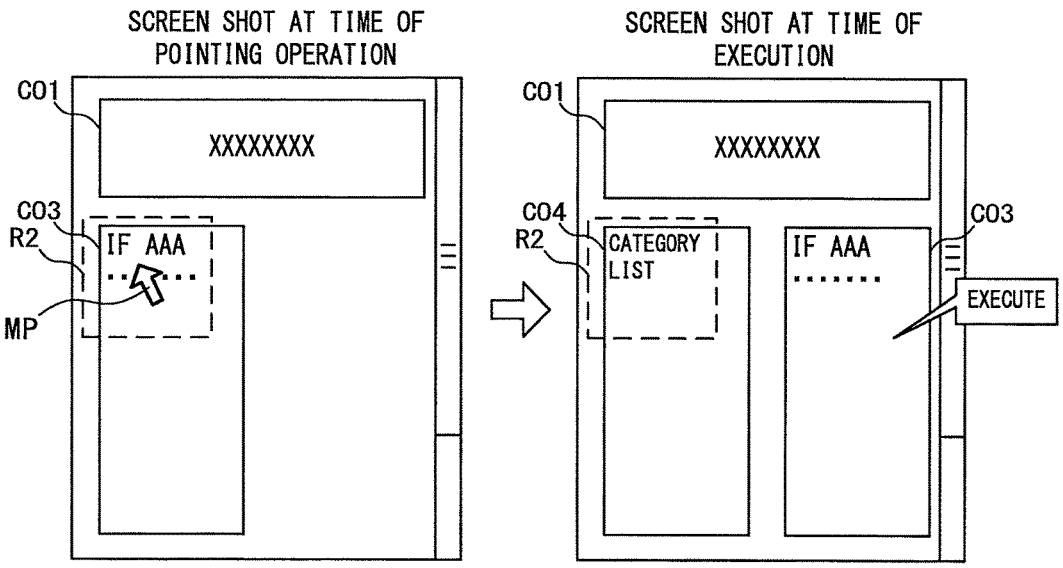

IDENTIFYING USER SELECTION USING COORDINATES AND SNAPSHOTS OF WEBPAGES

CROSS REFERENCE TO RELATED APPLICATIONS

This application is a National Stage of International Application No. PCT/JP2013/082003 filed Nov. 28, 2013, the contents of all of which are incorporated herein by reference in their entirety.

TECHNICAL FIELD

The present invention relates to a technical field in which a process corresponding to an element that is pointed at by a user from among elements included in a web page is executed.

BACKGROUND ART

For example, Non-Patent Literature 1 discloses that when a rendering engine of a browser acquires an HTML document from a network, the rendering engine starts drawing a web page without waiting that all HTMLs are analyzed.

CITATION LIST

Non Patent Literature

Non Patent Literature 1: Tali Garsiel & Paul Irish, "How Browsers Work: Behind the scenes of modern web browsers", [online], Google Inc., [searched on Oct. 28, 2013], Internet, <URL: http://www.html5rocks.com/en/tutorials/internals/howbrowserswork/>

SUMMARY OF INVENTION

Technical Problem

A user may perform an operation of pointing at an element such as a link and a button before rendering of a web page received by a terminal operated by the user is completed. In a case in which such an operation is received, when an event corresponding to the operation is processed by a browser, the pointed element may be located at a position different from the position at which the element is located at a time when the operation is received. In this case, the browser executes a process assuming that an element that is, at the time point when the event corresponding to the operation is processed, being located at the position that was pointed at by the user is pointed at. As a result, a process corresponding to an element different from an element intended by the user may be executed.

The present invention is made in view of the above situation, and an object of the present invention is to provide an information processing apparatus, an information processing method, and an information processing program, which can execute a process intended by a user who performs an operation of pointing at an element in a web page even when it takes time to perform rendering of the web page.

Solution to Problem

In order to solve the above problem, the invention according to claim 1 is an information processing apparatus comprising: an acquisition means that when an operation of pointing at a position of an element in a web page is received before drawing of the web page is completed, acquires coordinates indicating the position and a screen shot of the web page, the screen shot corresponding to a timing when the operation is received; an identification means that identifies an element indicated by an image located at a position indicated by the coordinates acquired by the acquisition means in the screen shot acquired by the acquisition means; and an execution control means that at a time when a process corresponding to an event of the received operation is to be executed, causes a process that is executed when the operation is performed on the element identified by the identification means to be executed as the process corresponding to the event.

According to this invention, the information processing apparatus executes a process corresponding to an element indicated by a partial image located at a pointed position in a screen shot corresponding to the timing when the operation is received. Therefore, it is possible to cause a process corresponding to the element intended by the user to be executed.

The invention according to claim 2 is the information processing apparatus according to claim 1, wherein the acquisition means acquires a screen shot of the web page at each predetermined timing, the information processing apparatus further includes an image storage control means that stores in a storage means the screen shot acquired by the acquisition means and an acquisition time of the screen shot in association with each other, a reception time storage control means that stores a reception time of the operation in the storage means, a completion time storage control means that when drawing of each element included in the web page is completed, stores a completion time of the drawing in the storage means, and a stored image acquisition means that when an elapsed time from an identified completion time to the reception time is shorter than a reference time, acquires from the storage means the screen shot corresponding to the acquisition time closest to the identified completion time among the acquisition times older than the identified completion time by at least the reference time among the acquisition times stored in the storage means, and when the elapsed time is equal to or longer than the reference time, acquires from the storage means the screen shot corresponding to the acquisition time closest to the identified completion time among the acquisition times equal to or later than the identified completion time among the acquisition times stored in the storage means, the identified completion time being closest to the reception time among the completion times earlier than the reception time among the completion times stored in the storage means, and the execution control means causes a process corresponding to an element indicated by an image located at a position indicated by the coordinates acquired by the acquisition means in the screen shot acquired by the stored image acquisition means to be executed.

According to this invention, even when a position of the element intended by the user is changed at a time point when the user performs the operation, it is possible to execute a process corresponding to the element intended by the user.

The invention according to claim 3 is the information processing apparatus according to claim 2, further comprising: a time acquisition means that acquires a time as the reference time, the acquired time being determined based on first times and second times acquired from a history storage means storing the first times and the second times as histories, the acquired time being the shortest of times that elapse from the first times to the second times, the first times being times at which drawing of a web page is completed, the second times being times at which an operation of pointing at a position of an element in the web page is received.

According to this invention, it is possible to set an appropriate time as the reference time.

The invention according to claim 4 is the information processing apparatus according to any one of claims 1 to 3, further comprising: an image acquisition means that acquires a second screen shot of the web page when the process corresponding to the event of the received operation is to be executed, wherein when there is no image difference between the screen shot acquired by the acquisition means and the second screen shot acquired by the image acquisition means, the execution control means causes a process of a case in which the operation is performed on an element that is currently displayed at a position indicated by the coordinates acquired by the acquisition means to be executed, and when there is an image difference, the identification means identifies, based on the second screen shot acquired by the image acquisition means, a current position of an element indicated by an image located at a position indicated by the coordinates acquired by the acquisition means in the screen shot acquired by the acquisition means and the execution control means causes a process of a case in which the operation is performed on an element that is currently displayed at the position identified by the identification means to be executed.

According to this invention, when there is no image difference, it is possible to execute a process corresponding to the element intended by the user by the same process as the conventional one.

The invention according to claim 5 is an information processing method performed by a computer, the method comprising: an acquisition step of when an operation of pointing at a position of an element in a web page is received before drawing of the web page is completed, acquiring coordinates indicating the position and a screen shot of the web page, the screen shot corresponding to a timing when the operation is received; an identification step of identifying an element indicated by an image located at a position indicated by the coordinates acquired in the acquisition step in the screen shot acquired in the acquisition step; and an execution control step of, at a time when a process corresponding to an event of the received operation is to be executed, causing a process that is executed when the operation is performed on the element identified in the identification step to be executed as the process corresponding to the event.

The invention according to claim 6 is an information processing program that causes a computer to function as: an acquisition means that when an operation of pointing at a position of an element in a web page is received before drawing of the web page is completed, acquires coordinates indicating the position and a screen shot of the web page, the screen shot corresponding to a timing when the operation is received; an identification means that identifies an element indicated by an image located at a position indicated by the coordinates acquired by the acquisition means in the screen shot acquired by the acquisition means; and an execution control means that at a time when a process corresponding to an event of the received operation is to be executed, causes a process that is executed when the operation is performed on the element identified by the identification means to be executed as the process corresponding to the event.

The invention according to claim 7 is an information processing program which a computer can execute along with a browser at the same time, the information processing program causing the computer to function as: an acquisition means that when an operation of pointing at a position of an element in a web page is received before drawing of the web page is completed, acquires coordinates indicating the position and a screen shot of the web page, the screen shot corresponding to a timing when the operation is received; an identification means that identifies an element indicated by an image located at a position indicated by the coordinates acquired by the acquisition means in the screen shot acquired by the acquisition means; a reception means that receives a notification of completion of the drawing of the web page from the browser; and an execution control means that at a time when the notification is received by the reception means, causes a process that is executed when the operation is performed on the element identified by the identification means to be executed.

According to this invention, it is also possible to cause a process corresponding to the element intended by the user to be executed by programs that enhance functions of the browser.

Advantageous Effects of Invention

BRIEF DESCRIPTION OF DRAWINGS

FIG. 3A is a block diagram showing an example of a schematic configuration of a user terminal 1 according to the embodiment. FIG. 3B is a block diagram showing an example of functional blocks of the user terminal 1 according to the embodiment.

FIG. 4A is a flowchart showing a process example of a pointing operation reception process of a system control unit 16 of the user terminal 1 according to the embodiment. FIG. 4B is a flowchart showing a process example of an event handling process execution control process of the system control unit 16 of the user terminal 1 according to the embodiment. FIG. 4C is a flowchart showing a process example of a pointing operation event control process of the system control unit 16 of the user terminal 1 according to the embodiment.

FIG. 8A is a diagram showing an example of a schematic configuration of an information processing server 3. FIG. 8B is a diagram showing an example of content registered in a history DB 32*a*.

FIG. 9 is a sequence diagram showing a process example of an information providing system S according to the embodiment.

FIGS. 12A and 12B are an example of screen shots of web pages in a case in which there is no difference between images. FIGS. 12C and 12D are an example of screen shots of web pages in a case in which there is a difference between images.

DESCRIPTION OF EMBODIMENTS

Hereinafter, embodiments of the present invention will be described in detail with reference to the drawings. The embodiments described below are embodiments where the present invention is applied to an information providing system.

Figure 1:
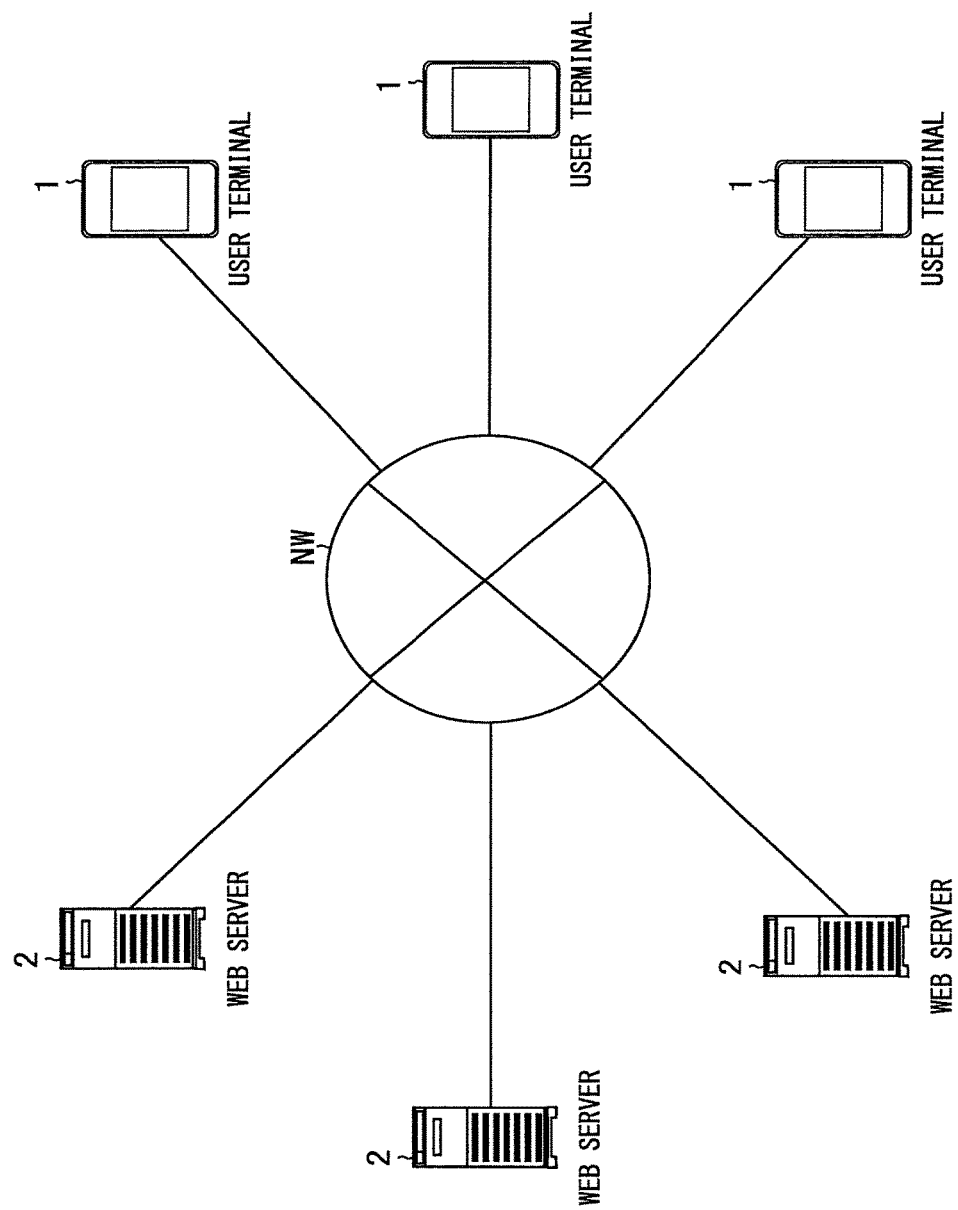
FIG. 1 is a diagram showing an example of a schematic configuration of an information providing system S according to the embodiment.

1. First Embodiment 1-1. Schematic Configuration and Function of Information Providing System First, a configuration of an information providing system S according to the present embodiment will be described with reference to FIGS. 1 and 2. FIG. 1 is a diagram showing an example of a schematic configuration of the information providing system S according to the present embodiment.

As shown in FIG. 1, the information providing system S includes a plurality of user terminals 1 and a plurality of web servers 2. The user terminals 1 and the web servers 2 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), and a gateway.

The user terminal 1 is a terminal device which is used by a user who browses web pages. For example, a personal computer, a PDA (Personal Digital Assistant), a mobile information terminal such as a smartphone, a tablet type computer, and a mobile phone are used as the user terminal 1. In the user terminal 1, software such as a browser is installed. By executing the browser, the user terminal 1 accesses the web server 2 based on an operation from the user and receives a web page from the web server 2. Then, the user terminal 1 displays the received web page. Specifically, the browser (a system control unit 16 executing the browser) receives, from the web server 2, data such as an HTML (HyperText Markup Language) document, CSS (Cascading Style Sheets), and images. The browser constructs a DOM (Document Object Model) tree by, for example, analyzing the HTML document and constructs a render tree based on the DOM tree and the CSS. The browser starts rendering before the analysis of the HTML document is completed. A reason of the above is, for example, to shorten a time taken until elements in the web page are displayed. During the rendering, the browser sequentially draws a plurality of elements included in the web page on the basis of the render tree that is being constructed. Examples of the elements of the web page include a link, a button, a character, an image, a bar, an input form, a table, and a list. A plurality of small elements may be included in one large element.

It may take time from the start to the end of the rendering. Therefore, during the rendering, the user can perform an operation of pointing at a position of an element displayed in the web page. The operation of pointing at a position of an element is referred to as a pointing operation, in the present embodiment. For example, when the user uses a mouse, as the pointing operation, there is a click operation. For example, when the user terminal 1 includes a touch panel, as the pointing operation, there are a touch operation and a tap operation. When a pointing operation is performed during the rendering, it may take time from when the pointing operation is performed to when the browser executes a process corresponding to the pointing operation. This phenomenon will be specifically described. The browser uses an event queue to process various events. The browser processes the pointing operation as an event. This event is referred to as a pointing operation event. The browser also processes drawing of each element as an event. This event is referred to as a rendering event. The browser adds the rendering event of each element to the event queue while analyzing the HTML document and constructing the render tree. The browser sequentially retrieves events from the event queue on a FIFO (First In, First Out) basis and executes a process corresponding to the retrieved events. When the user performs a pointing operation, a considerable number of rendering events have already been accumulated in the event queue. Therefore, it takes time for the browser to retrieve the pointing operation event from the event queue.

In the case of a conventional browser, the above phenomenon is accompanied by the problem described below. When the pointing operation is received, the browser acquires coordinates of the position pointed at by the pointing operation in a display area of the web page. The coordinates are referred to as pointed coordinates. Then, the browser adds a pointing operation event to the event queue by setting a parameter of the pointing operation event to the pointed coordinates. Thereafter, when the browser acquires the pointing operation event from the event queue, the browser identifies an element currently displayed in the display area of the web page at the position indicated by the pointed coordinates to which the parameter set. Then, the browser executes a process (event handler or event listener) corresponding to a pointing operation event of the identified element. On the other hand, elements of the web page are sequentially drawn also during a period of time from when the pointing operation event is received to when the process corresponding to the pointing operation event is executed. Therefore, the layout of the elements in the display area of the web page may change. In this case, the element located at the position indicated by the pointed coordinates when the pointing operation event is received may be different from the element located at the position indicated by the pointed coordinates when the process corresponding to the pointing operation event is executed. In this case, the browser executes the process corresponding to the element which is located at the position indicated by the pointed coordinates when the process corresponding to the pointing operation event is executed. In other words, a process corresponding to an element different from the element pointed at by the user is executed.

Therefore, when a pointing operation is received, the browser of the present embodiment acquires a screen shot of a web page corresponding to timing when the pointing operation is received and stores the screen shot in a memory. The screen shot is an image that reflects all or part of the screen. Also, the browser acquires the pointed coordinates pointed at by the pointing operation and stores the pointed coordinates in the memory. Thereafter, when the browser executes the process corresponding to the pointing operation event, the browser causes a process corresponding to an element indicated by an image of a portion, in the screen shot stored in the memory, located at a position indicated by the pointed coordinates stored in the memory to be executed as the process corresponding to the pointing operation event.

Figure 2A:
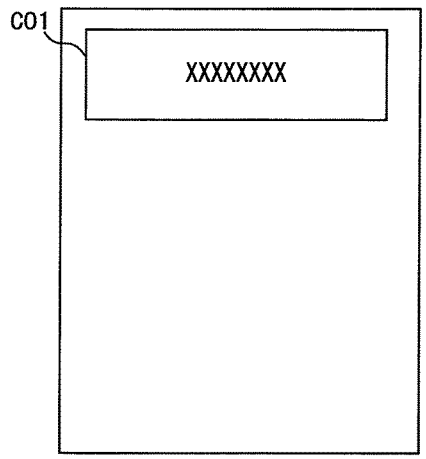
FIGS. 2A to 2D are diagrams showing a display example of a display area of a web page during rendering.
Figure 2B:
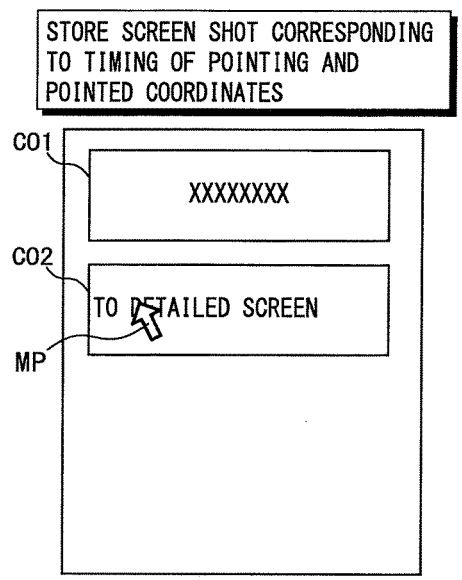
Figure 2C:
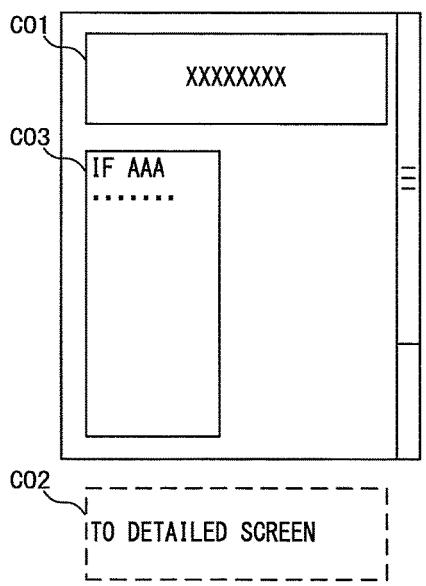
Figure 2D:
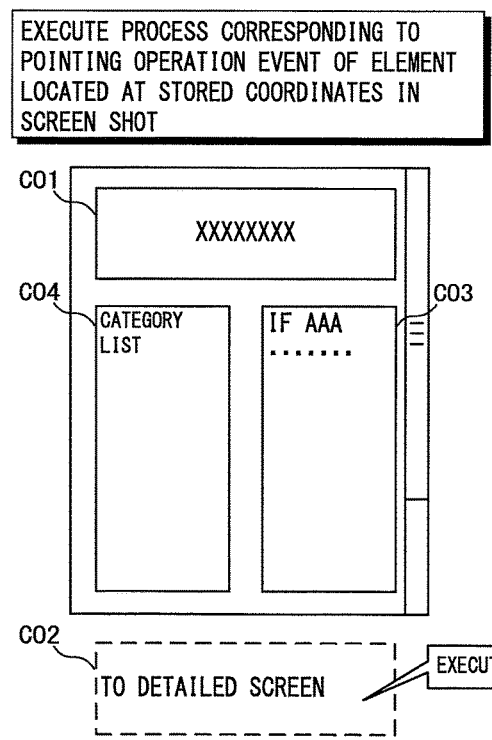

A specific example will be described. Each of FIGS. 2A to 2D is a diagram showing a display example of a display area of a web page during rendering. For example, a certain web page includes element CO1 to CO4. First, as shown in FIG. 2A, the element CO1 is drawn. Subsequently, as shown in FIG. 2B, the element CO2 is drawn. At this time, the rendering events of the elements CO3 and CO4 have been added to the event queue. At this time, for example, a user moves a mouse pointer MP by operating a mouse and performs a click at the position of the element CO2. The browser acquires a screen shot and pointed coordinates corresponding to this timing and stores the screen shot and the pointed coordinates in the memory. Specifically, the display area shown in FIG. 2B is stored. Thereafter, as shown in FIG. 2C, the element CO3 is drawn. At this time, the position of the element CO2 changes and the element CO2 moves to the outside of the display area. Thereafter, as shown in FIG. 2D, the element CO4 is drawn. Thereafter, a process corresponding to the pointing operation event is executed. In the display area in FIG. 2D, the element CO4 is displayed at the position indicated by the pointed coordinates. In this case, a conventional browser causes a process corresponding to the element CO4 to be executed. On the other hand, the browser of the present embodiment can identify the element CO2 as the element located at the position indicated by the pointed coordinates from the screen shot (FIG. 2B) corresponding to the timing when the pointing operation is received. Thereby, the browser causes a process corresponding to the element CO2 to be executed.

1-2. Configuration of User Terminal

Next, a configuration of the user terminal 1 will be described with reference to FIG. 3.

FIG. 3A is a block diagram showing an example of a schematic configuration of the user terminal 1 according to the present embodiment. As shown in FIG. 3A, the user terminal 1 includes a communication unit 11, a storage unit 12, an operation unit 13, a display unit 14, an input/output interface 15, and a system control unit 16. The system control unit 16 and the input/output interface 15 are connected through a system bus 17.

The communication unit 11 connects to the network NW and controls a communication state with the web server 2 and the like. The storage unit 12 includes, for example, a hard disk drive, a flash memory, and the like. The storage unit 12 is an example of a storage means of the present invention.

The storage unit 12 also stores various programs such as OS (Operating System) and a browser. The browser is an example of an information processing program of the present invention. For example, the various programs such as the browser may be acquired from a server device such as the web server 2 through the network NW or may be recorded in a recording medium such as an optical disk and a memory card and read through a drive device. The browser may be stored in the storage unit 12 in advance. The browser may be a program product.

The operation unit 13 is an input device that receives an operation such as a pointing operation from a user. The operation unit 13 transmits a signal indicating operation content from the user to the system control unit 16. For example, the operation unit 13 may include at least a keyboard, a mouse, a touch panel, a button, or the like. The display unit 14 is a display device that displays information such as an image and characters based on control of the system control unit 16. The display unit 14 may be, for example, a liquid crystal display. The input/output interface 15 performs interface processing between units from the communication unit 11 to the display unit 14 and the system control unit 16.

The system control unit 16 includes a CPU (Central Processing Unit) 16a, a ROM (Read Only Memory) 16b, a RAM (Random Access Memory) 16c, and the like. The RAM 16C is an example of a storage means of the present invention. The CPU 16a is an example of a processor. The present invention can also be applied to various processors different from the CPU. Each of the storage unit 12, the ROM 16b, and the RAM 16c is an example of a memory. The present invention can also be applied to various memories different from the storage unit 12, the ROM 16b, and the RAM 16c.

FIG. 3B is a diagram showing an example of functional blocks of the user terminal 1 according to the present embodiment. In the system control unit 16, the CPU 16a executes a program of the browser and the like, so that the system control unit 16 functions as an image storage control unit 161, a coordinate storage control unit 162, and an execution control unit 163 as shown in FIG. 3B. A combination of the image storage control unit 161 and the coordinate storage control unit 162 is an example of an acquisition means of the present invention. The coordinate storage control unit 162 is an example of a coordinate storage control means of the present invention. The execution control unit 163 is an example of an identification means and an execution control means of the present invention.

The image storage control unit 161 acquires a screen shot of a web page corresponding to the timing when the pointing operation is received. Then, the image storage control unit 161 stores the screen shot in the RAM 16c (or the storage unit 12). For example, when the entire screen of the display unit 14 is a display area of the web page, the image storage control unit 161 acquires a screen shot of the entire screen. When a part of the screen of the display unit 14 is the display area of the web page, the image storage control unit 161 may acquire a screen shot of the entire screen or may acquire a screen shot of only the display area of the web page. When the pointing operation is received, the coordinate storage control unit 162 acquires the pointed coordinates pointed at by the pointing operation. Then, the coordinate storage control unit 162 stores the pointed coordinates in the RAM 16c (or the storage unit 12). The execution control unit 163 identifies an element indicated by an image of a portion, in the screen shot acquired by the image storage control unit 161, located at a position indicated by the pointed coordinates acquired by the coordinate storage control unit 162. Then, the execution control unit 163 causes a process that should be executed when the identified element is pointed at by a pointing operation to be executed as a process corresponding to the received pointing operation event.

1-3. Operation of User Terminal

Next, an operation of the user terminal will be described with reference to FIG. 4. For example, when the user terminal 1 transmits a request of an HTML document and the like to the web server 2, the system control unit 16 adds an event listener of a pointing operation event. Thereby, even when a pointing operation event is received during rendering based on the HTML document received from the web server 2, the event listener is executed. The system control unit 16 adds the event listener so that the event listener is executed even when any position in the display area of the web page is pointed at by the pointing operation. Thereafter, when the drawing of the web page is completed, the system control unit 16 deletes the added event listener.

FIG. 4A is a flowchart showing a process example of a pointing operation reception process of the system control unit 16 of the user terminal 1 according to the present embodiment. When a pointing operation is received by the operation unit 13 during rendering, a pointing operation event occurs. Thereby, the added event listener is called. The pointing operation reception process is a process executed in the added event listener.

As shown in FIG. 4A, the image storage control unit 161 acquires a screen shot of a display area of a current web page and stores the screen shot in the RAM 16c (step S1). Subsequently, the coordinate storage control unit 162 acquires the pointed coordinates that are one of parameters of the pointing operation event from the pointing operation event (step S2). Subsequently, the coordinate storage control unit 162 adds a special process event to an event queue reserved in the RAM 16c (step S3). The special process event is an event indicating that it is necessary to identify an element at which the user points by a pointing operation. There is a pointed coordinates as a parameter of the special process event. The coordinate storage control unit 162 sets a parameter of the special process event to the acquired pointed coordinates and adds the special process event to the event queue. After step S3 is completed, the system control unit 16 ends the pointing operation reception process.

FIG. 4B is a flowchart showing a process example of an event handling process execution control process of the system control unit 16 of the user terminal 1 according to the present embodiment. For example, when the browser is started, the system control unit 16 starts the event handling process execution control process. As shown in FIG. 4B, the execution control unit 163 acquires one event from the event queue (step S11). Subsequently, the execution control unit 163 determines whether or not the acquired event is the special process event (step S12). At this time, if the execution control unit 163 determines that the acquired event is not the special process event (step S12: NO), the execution control unit 163 proceeds to step S14. On the other hand, if the execution control unit 163 determines that the acquired event is the special process event (step S12: YES), the execution control unit 163 proceeds to step S13. In step S13, the execution control unit 163 executes a pointing operation event control process.

FIG. 4C is a flowchart showing a process example of a pointing operation event control process of the system control unit 16 of the user terminal 1 according to the present embodiment. As shown in FIG. 4C, the execution control unit 163 acquires the screen shot of the time when the pointing operation is received from the RAM 16c and acquires the pointed coordinates from the special process event (step S16). Subsequently, the execution control unit 163 defines, as a partial image, a range of a predetermined number of pixels from the position indicated by the pointed coordinates in the horizontal and the vertical directions in the acquired screen shot. Then, the execution control unit 163 recognizes one or more characters displayed in the partial image by, for example, a known character recognition method (step S17). For example, in the example of FIG. 2, "To detailed screen" displayed in the element CO3 is recognized. Subsequently, the execution control unit 163 searches a DOM tree for a node including the recognized characters as a text, a caption, or the like. Then, the execution control unit 163 acquires an ID of an element corresponding to a found node (step S18). Thereby, the execution control unit 163 identifies the element pointed at by the pointing operation. Subsequently, the execution control unit 163 changes an event to be processed by the event handling process execution control process from the special event to a pointing operation event (step S19). Specifically, the execution control unit 163 generates the pointing operation event. Subsequently, the execution control unit 163 sets an event target to the identified element (step S20). The event target is an element on which the pointing operation event occurs. Specifically, there is an ID of the event target as one of parameters of the pointing operation event. The execution control unit 163 sets the ID of the event target to the acquired ID. Further, the execution control unit 163 may set one of the parameters of the pointing operation event to the acquired pointed coordinates. After step S20 is completed, the system control unit 16 ends the pointing operation reception process.

After the pointing operation event control process is completed, the execution control unit 163 causes a process corresponding to the acquired event to be executed by, for example, OS (step S14). When the pointing operation event control process is executed, the execution control unit 163 causes a process corresponding to the pointing operation event generated by the pointing operation event control process to be executed. For example, the execution control unit 163 may call an API (Application Programming Interface) corresponding to a type of the event. In the case of the pointing operation event, when the system control unit 16 on the OS side executes the process corresponding to the event, the system control unit 16 calls an event handler (or an event listener) of the pointing operation event of an event target indicated by the ID set as a parameter of the pointing operation event. Thereby, the system control unit 16 executes a process corresponding to the element at which the user points by the pointing operation.

After step S14, the execution control unit 163 determines whether or not the browser is ended by a user operation (step S15). At this time, if the execution control unit 163 determines that the browser is not ended (step S15: NO), the execution control unit 163 proceeds to step S11. On the other hand, if the execution control unit 163 determines that the browser is ended (step S15: YES), the execution control unit 163 ends the event handling process execution control process.

Conventionally, the ID of the event target is not set as a parameter of the pointing operation event. In this case, the system control unit 16 on the OS side identifies an element, as an event target, located at a position indicated by the pointed coordinates at a time point when the system control unit 16 executes a process corresponding to the pointing operation event. Then, the system control unit 16 executes a process corresponding to the identified element. Therefore, the aforementioned problem occurs.

As described above, according to the present embodiment, when a pointing operation is received before the drawing of the web page is completed, the system control unit 16 acquires pointed coordinates and a screen shot corresponding to the timing when the pointing operation is received. Further, the system control unit 16 identifies an element indicated by a partial image located at a position indicated by the pointed coordinates in the acquired screen shot. Further, when the system control unit 16 executes a process corresponding to the event of the received pointing operation, the system control unit 16 causes a process that is executed when the identified element is pointed at by the pointing operation to be executed as the process corresponding to the pointing operation event. Therefore, it is possible to cause a process corresponding to an element intended by the user to be executed.

In the present embodiment, when the system control unit 16 executes a pointing operation event, the system control unit 16 executes a process to identify an element indicated by an image of a portion located at a position indicated by the pointed coordinates in the screen shot (steps S17, S18, and S20 in the event handling process execution control process). However, the system control unit 16 may identify the element when receiving the pointing operation. In this case, in the pointing operation reception process, the system control unit 16 sets the event target ID of the pointing operation event to the ID of the identified element. Then, the system control unit 16 adds the pointing operation event to the event queue without adding the special process event. In the event handling process execution control process, the system control unit 16 can cause a process corresponding to the element pointed at by the user to be executed by performing processing based on the pointing operation event added to the event queue.

2. Second Embodiment

Next, a second embodiment will be described with reference to FIGS. 5 to 11.

2-1. Schematic Configuration and Function of Information Providing System

Figure 5:
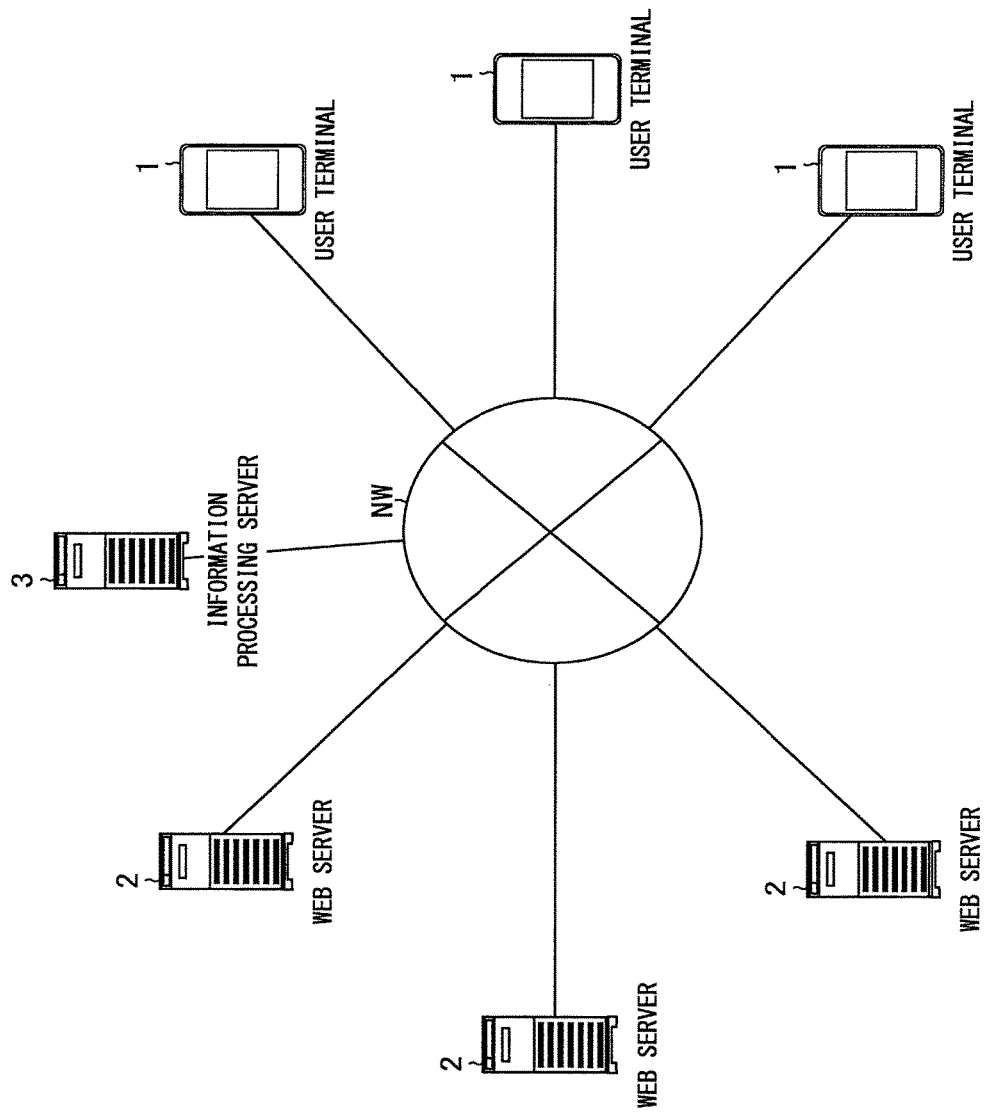
FIG. 5 is a diagram showing an example of a schematic configuration of an information providing system S according to an embodiment.

First, a configuration of an information providing system S according to the present embodiment will be described with reference to FIG. 5. FIG. 5 is a diagram showing an example of a schematic configuration of the information providing system S according to the present embodiment. In FIG. 5, the same elements as those in FIG. 1 are denoted by the same reference numerals. As shown in FIG. 5, the information providing system S includes a plurality of user terminals 1, a plurality of web servers 2, and an information processing server 3. The user terminals 1, the web servers 2, and the information processing server 3 can transmit and receive data to and from each other through a network NW. The information processing server 3 is, for example, a web server. The information processing server 3 transmits a web page to the user terminal 1 in response to a request from the user terminal 1. The configuration of the user terminal 1 is the same as that of the first embodiment.

It takes a slight time from when a user intends to perform a pointing operation to a position where a desired element is located to when the user performs the point operation to the position. This time is referred to as a reaction time. During rendering, elements included in a web page are drawn one after another. Therefore, at a time point when the pointing operation is performed to the position where the desired element was located, the desired element may have moved to another position. Even when the system control unit 16 performs processing by using a screen shot stored at timing when the pointing operation is received, a process corresponding to an element different from the desired element is executed.

In the present embodiment, the system control unit 16 stores a screen shot in the RAM 16c at every predetermined timing during the rendering. The user terminal 1 determines a screen shot used to identify an element pointed at by the pointing operation from among a plurality of stored screen shots.

Figure 6A:
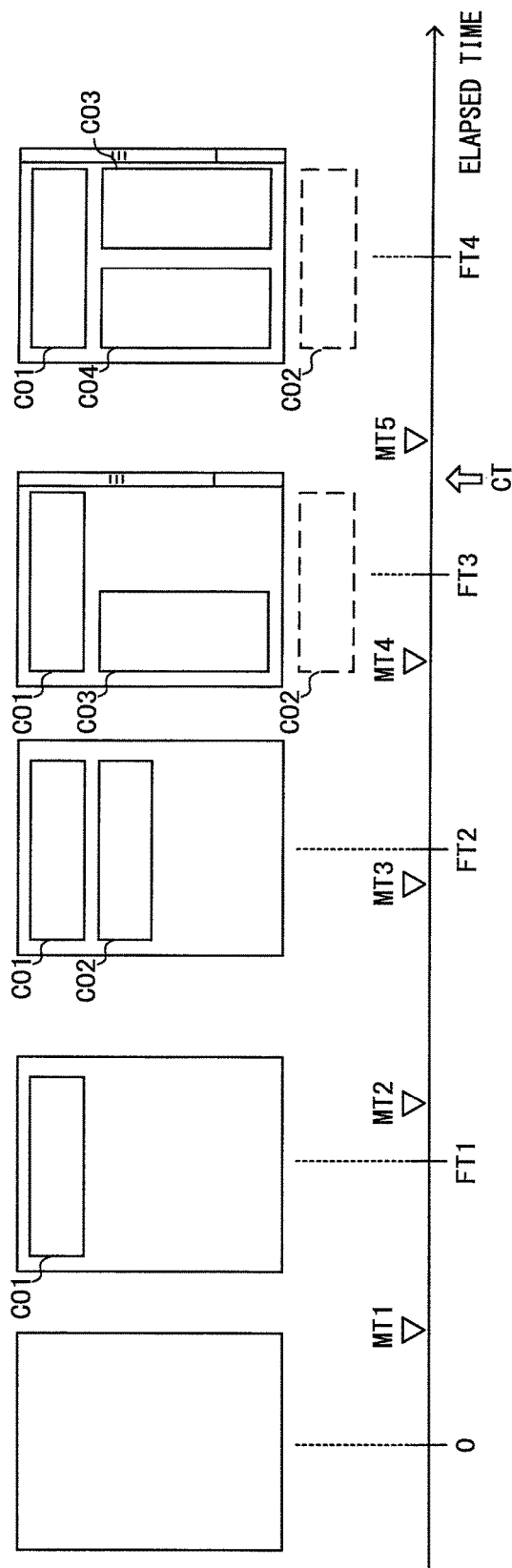
FIGS. 6A to 6C are diagrams showing an example of a completion time of drawing of elements of a web page and a storage time of a screen shot, according to the passage of time.

FIG. 6A is a diagram showing an example of a completion time of drawing of elements of a web page and a storage time of a screen shot, according to the passage of time. For example, a web page includes elements CO1 to CO4 in the same manner as in FIG. 2. As shown in FIG. 6A, the elements CO1 to CO4 are drawn in this order. Specifically, the drawing of the element CO1 is completed at time FT1, the drawing of the element CO2 is completed at time FT2, the drawing of the element CO3 is completed at time FT3, and the drawing of the element CO4 is completed at time FT4. On the other hand, after the rendering is started, the system control unit 16 stores a screen shot in the RAM 16c, for example, every time a predetermined time elapses. For example, as shown in FIG. 6A, a screen shot is stored at each timing of time MT1 to time MT5. Here, it is assumed that the pointing operation is received at time CT. The chronological order from old to new of the timing is MT4, FT3, CT, MT5, and FT4. Therefore, the user performs a pointing operation after the drawing of the element CO3 is completed. Before the element CO3 is drawn, the element CO2 is displayed at the position of the element CO3. Therefore, depending on the pointed coordinates, it is a question whether the user performs the pointing operation to point at the element CO2 or the element CO3.

Figure 6C:
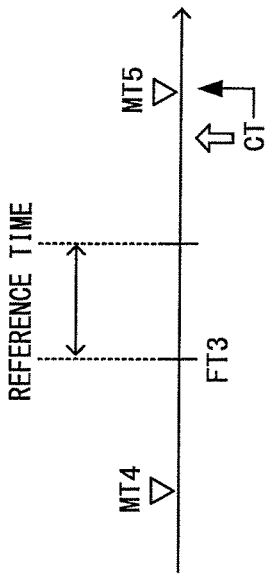
Figure 6B:
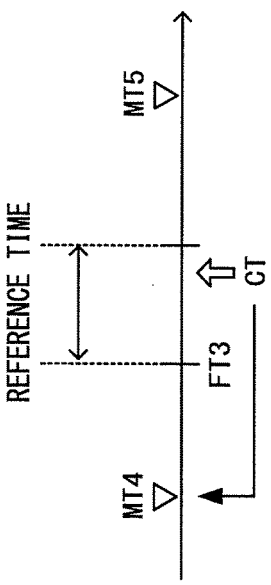

When the user performs a pointing operation, there is a necessary minimum reaction time. For example, the time may be set as a reference time. For the user to perform a pointing operation to the drawing of a certain element, it takes at least the reference time after the drawing of the element is completed. On the basis of an elapsed time from when the drawing of the element is completed to when the pointing operation is received and the reference time, the system control unit 16 determines a screen shot to identify the element pointed at by the pointing operation. As shown in FIG. 6B, when the elapsed time from when the drawing of the element CO3 is completed to when the pointing operation is received is shorter than the reference time, the probability that the user intends to point at the element CO3 is low. Therefore, the system control unit 16 identifies the element by using a screen shot, as the screen shot corresponding to the timing when the pointing operation is received, which was stored at the latest time, MT4, among the screen shots stored the reference time or more before the time FT3, among the screen shots stored before the drawing of the element CO3 is completed.

The screen shot includes the elements CO1 and CO2 but does not include the element CO3. On the other hand, as shown in FIG. 6C, when the elapsed time from when the drawing of the element CO3 is completed to when the pointing operation is received is longer than or equal to the reference time, there is the probability that the user intends to point at the element CO3. Therefore, the system control unit 16 identifies the element by using a screen shot, as a screen shot corresponding to the timing when the pointing operation is received, which was stored at the oldest time, MT5, among the screen shots stored after drawing of the element CO3 is completed. The screen shot includes the elements CO1 and CO3.

The reference time may be set in advance. Alternatively, the reference time may be determined for each user based on a history of operations of the user. For example, the time when the drawing of the web page is completed and the time when the pointing operation is received are stored as a history. Then, the shortest time period among the elapsed time periods from when the drawing of the web page is completed to when the pointing operation is received may be determined as the reference time. For example, the information processing server 3 may store the histories of all users, and the information processing server 3 may determine the reference time. Alternatively, each user terminal may store the history, and each user terminal may determine the reference time. In the present embodiment, the information processing server 3 determines the reference time.

2-2. Functional Blocks of System Control Unit

Figure 7:
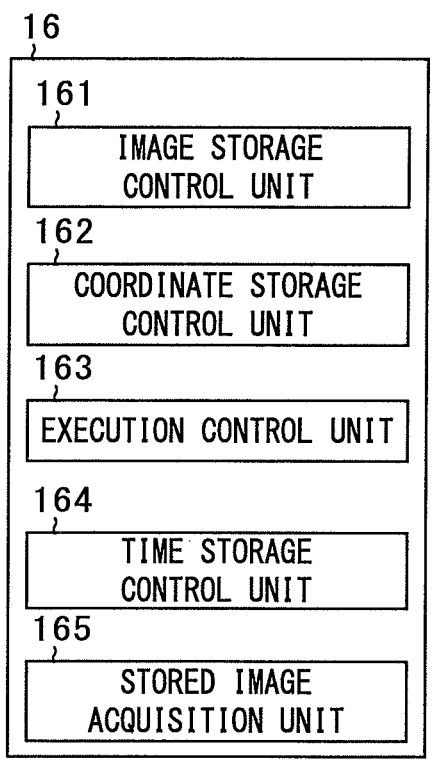
FIG. 7 is a diagram showing an example of functional blocks of a user terminal 1 according to the embodiment.

FIG. 7 is a diagram showing an example of functional blocks of the user terminal 1 according to the present embodiment. In FIG. 7, the same elements as those in FIG. 3B are denoted by the same reference numerals. As shown in FIG. 7, the system control unit 16 functions as an image storage control unit 161, a coordinate storage control unit 162, an execution control unit 163, a time storage control unit 164, a stored image acquisition unit 165, and the like. The image storage control unit 161 is an example of an image storage control means of the present invention. The coordinate storage control unit 162 is an example of a reception time storage control means of the present invention. The time storage control unit 164 is an example of a completion time storage control means of the present invention. The stored image acquisition unit 165 is an example of a stored image acquisition means and a time acquisition means of the present invention.

The image storage control unit 161 stores a screen shot and a storage time of the screen shot in association with each other in the RAM 16c at every predetermined timing. The storage time of the screen shot is also a time when the image storage control unit 161 acquires the screen shot. When a pointing operation is received, the coordinate storage control unit 162 stores pointed coordinates and a reception time of the pointing operation in the RAM 16c. Every time a drawing of an element included in a web page is completed during rendering of the web page, the time storage control unit 164 stores a completion time of the drawing in the RAM 16c. When a process corresponding to a pointing operation event is executed, the stored image acquisition unit 165 acquires the latest completion time as an identified completion time from among completion times older than the reception time of the pointing operation among the completion times stored in the RAM 16c. The stored image acquisition unit 165 calculates an elapsed time from the identified completion time to the reception time. When the elapsed time is shorter than the reference time, the stored image acquisition unit 165 acquires the latest storage time of storage times earlier than the identified completion time by the reference time or more, among the storage times stored in the RAM 16c. On the other hand, when the elapsed time is longer than or equal to the reference time, the stored image acquisition unit 165 acquires the oldest storage time of storage times after the identified completion time, among the storage times stored in the RAM 16c. Then, the stored image acquisition unit 165 acquires a screen shot corresponding to the acquired storage time from the RAM 16c as a screen shot corresponding to the timing when the pointing operation is received. The execution control unit 163 identifies an event target by using the screen shot acquired by the stored image acquisition unit 165.

2-3. Configuration of Information Processing Server

Next, a configuration of the information processing server 3 will be described with reference to FIG. 8. FIG. 8A is a block diagram showing an example of a schematic configuration of the information processing server 3. As shown in FIG. 8A, the information processing server 3 includes a communication unit 31, a storage unit 32, an input/output interface 33, and a system control unit 34. The system control unit 34 and the input/output interface 33 are connected through a system bus 35.

The communication unit 31 connects to a network NW and controls communication state with the user terminal 1 and the like. The storage unit 32 includes, for example, a hard disk drive and the like. The storage unit 32 is an example of a history storage means of the present invention. In the storage unit 32, databases such as a history DB 32a are constructed. The "DB" is an abbreviation of database.

FIG. 8B is a diagram showing an example of content registered in the history DB 32a. In the history DB 32a, histories of a request (HTTP (HyperText Transfer Protocol) request) transmitted from the user terminal 1 to the information processing server 3 and transmission of a response to the request from the information processing server 3 are registered. As shown in FIG. 8B, in the history DB 32a, a user ID, a history type, and a time are registered in association with each other. The user ID is identification information of a user. The user ID indicates a user who uses the user terminal 1 that transmits a request to the information processing server 3 or a user who uses the user terminal 1 that receives a response from the information processing server 3. The history type indicates whether the registered history is a transmission history of a response or a reception history of a request. When the registered history is the transmission history, a transmission time of the response is registered as the time. When the registered history is the reception history, a reception time of the request is registered as the time. The system control unit 34 registers the transmission time of the response as a completion time of drawing of a web page drawn by the user terminal 1 that receives the response. Further, the system control unit 34 registers the reception time of the request as a time when a pointing operation is received by the user terminal 1 that transmits the request. The system control unit 34 assumes the transmission time of the response as the completion time of the drawing. Therefore, for example, the system control unit 34 may register a history only when the system control unit 34 transmits an HTML document of a web page whose amount of information is smaller than or equal to a predetermined value and when the system control unit 34 receives a request generated from a pointing operation to a web page whose amount of information is smaller than or equal to a predetermined value. Such a web page may be determined in advance. The transmission time is an example of a first time of the present invention and the reception time is an example of a second time of the present invention.

The storage unit 12 also stores various data such as an HTML (HyperText Markup Language) document XML (Extensible Markup Language) documents, image data, text data, and electronic documents, for displaying web pages. Further, the storage unit 12 stores various programs such as OS, a WWW (World Wide Web) server program, and a DBMS (Database Management System). For example, the various programs may be acquired from another server device or the like through the network NW or may be recorded in a recording medium such as an optical disk and read through a drive device.

The input/output interface 33 performs interface processing among the communication unit 31, the storage unit 32, and the system control unit 34. The system control unit 34 includes a CPU 34a, a ROM 34b, a RAM 34c, and the like. In the system control unit 34, the CPU 34a executes various programs, so that the system control unit 34 controls each unit of the information processing server 3.

2-4. Operation of Information Providing System

Next, an operation of the information providing system S will be described with reference to FIGS. 9 to 11.

FIG. 9 is a sequence diagram showing a process example of the information providing system S according to the present embodiment. For example, the information processing server 3 transmits an HTML document to the user terminal 1 in response to a request from the user terminal 1 (step S21). At this time, the information processing server 3 registers a user ID of a user who uses the user terminal 1 to which the HTML document is transmitted and a transmission time of the HTML document in the history DB 32a (step S22). The user terminal 1 that receives the HTML document displays a web page based on the HTML document (step S23). Thereafter, the user performs a pointing operation and the user terminal 1 receives the operation (step S24). Then, the user terminal 1 transmits a request corresponding to an element pointed at by the pointing operation to the information processing server 3 (step S25). The request includes the user ID of the user who uses the user terminal 1. The information processing server 3 that receives the request registers the user ID and a reception time of the request in the history DB 32a (step S26). Then, the information processing server 3 determines the reference time (step S27). Specifically, the information processing server 3 acquires all pairs of the transmission time and the reception time corresponding to the user ID included in the request from the history DB 32a. Subsequently, the information processing server 3 calculates an elapsed time by subtracting the transmission time from the reception time for each acquired pair. Then, the information processing server 3 determines the shortest elapsed time among the calculated elapsed times to be the reference time. The information processing server 3 transmits the determined reference time the user terminal 1 (step S28). For example, the information processing server 3 may transmit the reference time along with the response to the request or may transmit the reference time at a predetermined timing. The user terminal 1 that receives the reference time stores the reference time in the storage unit 12.

Figure 10A:
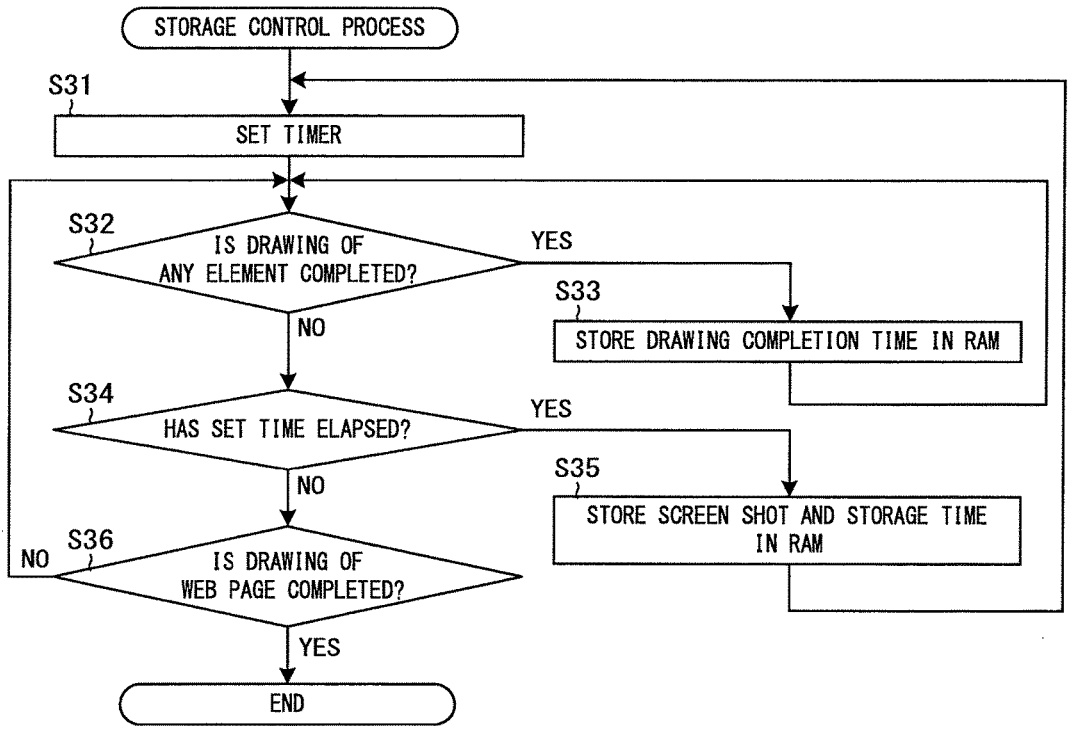
FIG. 10A is a flowchart showing a process example of a storage control process of a system control unit 16 of the user terminal 1 according to the embodiment.

FIG. 10A is a flowchart showing a process example of a storage control process of the system control unit 16 of the user terminal 1 according to the present embodiment. For example, when the system control unit 16 starts rendering of a web page based on an HTML document received from the web server 2 or the information processing server 3, the system control unit 16 executes the storage control process. As shown in FIG. 10A, the image storage control unit 161 sets a timer for storing a screen shot (step S31). Subsequently, the time storage control unit 164 determines whether or not drawing of any element of a web page is completed (step S32). At this time, if the time storage control unit 164 determines that the drawing of an element is completed (step S32: YES), the time storage control unit 164 proceeds to step S33. In step S33, the time storage control unit 164 acquires a current time as a completion time and stores the completion time in the RAM 16c. Subsequently, the time storage control unit 164 proceeds to step S32.

On the other hand, if the time storage control unit 164 determines that the drawing of any element is not completed (step S32: NO), the time storage control unit 164 proceeds to step S34. In step S34, the image storage control unit 161 determines whether or not time set by the timer has elapsed. At this time, if the image storage control unit 161 determines that the set time has elapsed (step S34: YES), the image storage control unit 161 proceeds to step S35. In step S35, the image storage control unit 161 acquires a screen shot of the display area of the current web page. Further, the image storage control unit 161 acquires a current time as the storage time. Then, the image storage control unit 161 stores the acquired screen shot and the storage time in the RAM 16c in association with each other. Subsequently, the image storage control unit 161 proceeds to step S31.

On the other hand, if the image storage control unit 161 determines that the set time has not elapsed (step S34: NO), the image storage control unit 161 proceeds to step S36. In step S36, the time storage control unit 164 determines whether or not the drawing of the web page is completed (step S36). At this time, if the time storage control unit 164 determines that the drawing of the web page is not completed (step S36: NO), the time storage control unit 164 proceeds to step S32. On the other hand, if the time storage control unit 164 determines that the drawing of the web page is completed (step S36: YES), the time storage control unit 164 ends the storage control process.

Figure 10B:
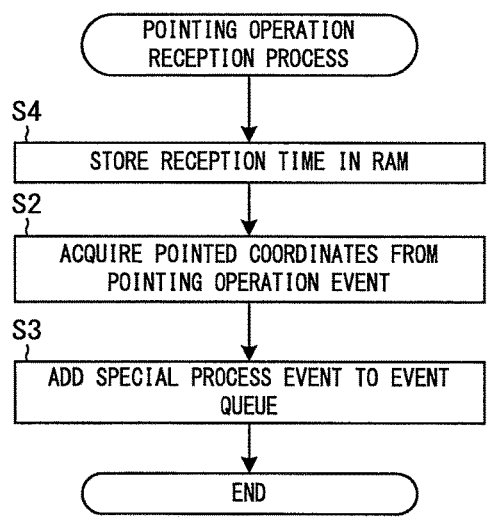
FIG. 10B is a flowchart showing a process example of a pointing operation reception process of the system control unit 16 of the user terminal 1 according to the embodiment.

FIG. 10B is a flowchart showing a process example of a pointing operation reception process of the system control unit 16 of the user terminal 1 according to the present embodiment. In FIG. 10B, the same processes as those in FIG. 4A are denoted by the same reference numerals. As shown in FIG. 10B, the coordinate storage control unit 162 acquires a current time as a reception time and stores the reception time in the RAM 16c (step S4). Subsequently, the coordinate storage control unit 162 performs steps S2 and S3 and ends the pointing operation reception process.

Figure 11:
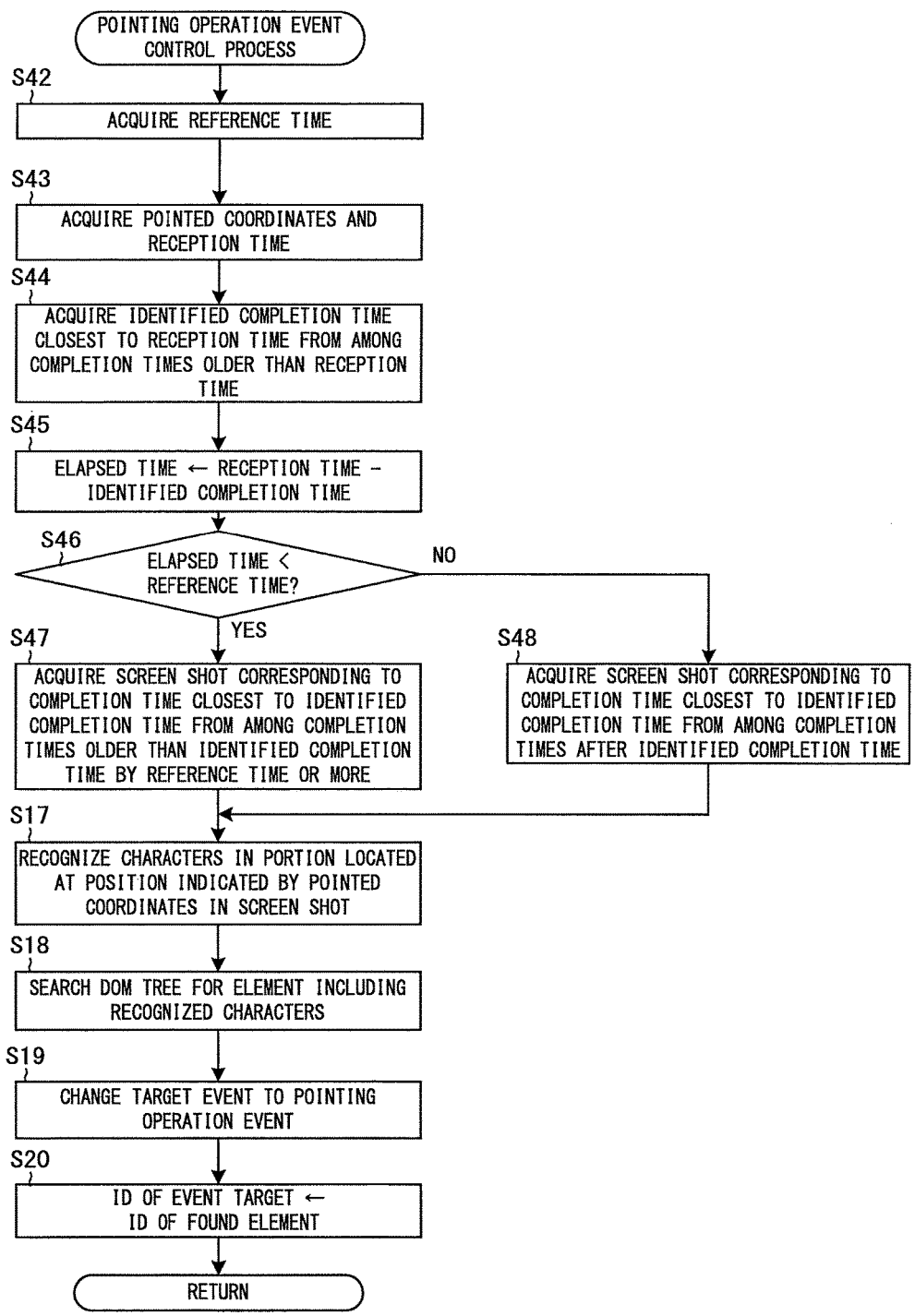
FIG. 11 is a flowchart showing a process example of a pointing operation event control process of the system control unit 16 of the user terminal 1 according to the embodiment.

FIG. 11 is a flowchart showing a process example of a pointing operation event control process of the system control unit 16 of the user terminal 1 according to the present embodiment. The event handling process execution control process is the same as that of the first embodiment. As shown in FIG. 11, the stored image acquisition unit 165 acquires the reference time from the storage unit 12 (step S42). Subsequently, the stored image acquisition unit 165 acquires the pointed coordinates from the pointing operation event and acquires the reception time of the pointing operation from the RAM 16c (step S43). Subsequently, the stored image acquisition unit 165 acquires a completion time, as an identified completion time, closest to the reception time from among completion times older than the reception time among the completion times of drawing stored in the RAM 16c (step S44). Subsequently, the stored image acquisition unit 165 calculates an elapsed time by subtracting the identified completion time from the reception time (step S45).

Subsequently, the stored image acquisition unit 165 determines whether or not the elapsed time is shorter than the reference time (step S46). At this time, if the stored image acquisition unit 165 determines that the elapsed time is shorter than the reference time (step S46: YES), the stored image acquisition unit 165 proceeds to step S47. In step S47, the stored image acquisition unit 165 acquires a storage time closest to the identified completion time from among storage times older than the identified completion time by the reference time or more, among the storage times of screen shot stored in the RAM 16c. Then, the stored image acquisition unit 165 acquires a screen shot corresponding to the identified storage time from the RAM 16c. Subsequently, the stored image acquisition unit 165 proceeds to step S17. On the other hand, if the stored image acquisition unit 165 determines that the elapsed time is not shorter than the reference time (step S46: NO), the stored image acquisition unit 165 proceeds to step S48. In step S48, the stored image acquisition unit 165 acquires a storage time closest to the identified completion time from among storage times after the identified completion time among the storage times of screen shot stored in the RAM 16c. Then, the stored image acquisition unit 165 acquires a screen shot corresponding to the identified storage time from the RAM 16c. Subsequently, the stored image acquisition unit 165 proceeds to step S17. After performing steps S17 to S20, the system control unit 16 ends the pointing operation event control process.

As described above, according to the present embodiment, the system control unit 16 stores a screen shot of a web page and a storage time in association with each other in the RAM 16c at every predetermined timing. Further, the system control unit 16 stores the pointed coordinates and the reception time of the pointing operation in the RAM 16c. Further, the system control unit 16 stores the completion time of drawing of each element included in the web page in the RAM 16c when the drawing of the element is completed. Further, when the elapsed time from the identified completion time to the reception time is shorter than the reference time, the system control unit 16 acquires a screen shot corresponding to the storage time closest to the identified completion time among the storage times older than the identified completion time by the reference time or more from the RAM 16c. On the other hand, when the elapsed time is longer than or equal to the reference time, the system control unit 16 acquires a screen shot corresponding to the storage time closest to the identified completion time among the storage times after the identified completion time from the RAM 16c. Then, the system control unit 16 causes a process corresponding to an element indicated by a partial image located at a position indicated by the pointed coordinates in the acquired screen shot to be executed. Therefore, even when a position of the element intended by the user is changed at a time point when the user performs the pointing operation, it is possible to execute a process corresponding to the element intended by the user.

The system control unit 16 may acquire the shortest time as the reference time, among the elapsed times from the transmission time of the response to the reception time of the request. In this case, it is possible to set the reference time to an appropriate time.

3. Third Embodiment

Next, a third embodiment will be described with reference to FIGS. 12 to 14. The configuration of the information providing system S and the configuration of the user terminal 1 are the same as those of the first embodiment.
3-1. Schematic Function of Information Providing System In the present embodiment, the system control unit 16 acquires a screen shot at the time of executing a process corresponding to the pointing operation event. The system control unit 16 determines whether or not there is an image difference between a screen shot corresponding to the timing when the pointing operation is received and a screen shot at the time of executing a process corresponding to the pointing operation event. For example, the system control unit 16 may determine whether there is a difference in the entire display area of the web page or may determine whether there is a difference in a range of a predetermined number of pixels from the pointed coordinates in the horizontal and the vertical directions. When there is no image difference, the system control unit 16 performs the same process as the conventional one. On the other hand, when there is an image difference, the system control unit 16 identifies the coordinates of a position after the movement of the element pointed at by the user on the basis of two screen shots. The system control unit 16 sets the pointed coordinates which are a parameter of the pointing operation event to the identified coordinates. Then, the system control unit 16 causes a process corresponding to the pointing operation event to be executed.

A specific example will be described. FIGS. 12A and 12B are an example of screen shots of web pages in a case in which there is no difference between images. During rendering, as shown in FIG. 12A, the elements CO1 and CO4 are displayed. At this timing, a pointing operation to the element CO4 is received. Thereafter, as shown in FIG. 12B, the element CO3 is further drawn. However, the position of the element CO4 is not changed. In this case, a range where an image difference is determined is assumed to be a range R1 which is a predetermined range from the pointed coordinates. In the range R1, there is no image difference between FIG. 12A and FIG. 12B. In this case, the system control unit 16 causes the pointing operation event to be executed without changing the pointed coordinates at the time of receiving the pointing operation. In the display area in FIG. 12B, the element CO4 is displayed at the position indicated by the pointed coordinates. Therefore, the system control unit 16 executes a process corresponding to the pointing operation event of the element CO4.

FIGS. 12C and 12D are an example of screen shots of web pages in a case in which there is a difference between images. During rendering, as shown in FIG. 12C, the elements CO1 and CO3 are displayed. At this timing, a pointing operation to the element CO3 is received. Thereafter, as shown in FIG. 12D, the element CO4 is further drawn. Accordingly, the element CO3 is moved. In this case, in a predetermined range R2 from the pointed coordinates, there is an image difference between FIG. 12C and FIG. 12D. In this case, the system control unit 16 identifies the coordinates of a position, in the screen shot of FIG. 12D, to which the partial image of the range R2 in the screen shot of FIG. 12C is moved. When an element which the user points at by a pointing operation is moved outside the display area of the web page, the coordinates cannot be identified. The system control unit 16 causes the pointing operation event to be executed by using the identified coordinates as the pointed coordinates. In this case, the pointed coordinates indicate the position where the element CO3 is displayed in FIG. 12D. Therefore, the system control unit 16 executes a process corresponding to the pointing operation event of the element CO3.

3-2. Functional Blocks of System Control Unit

Figure 13:
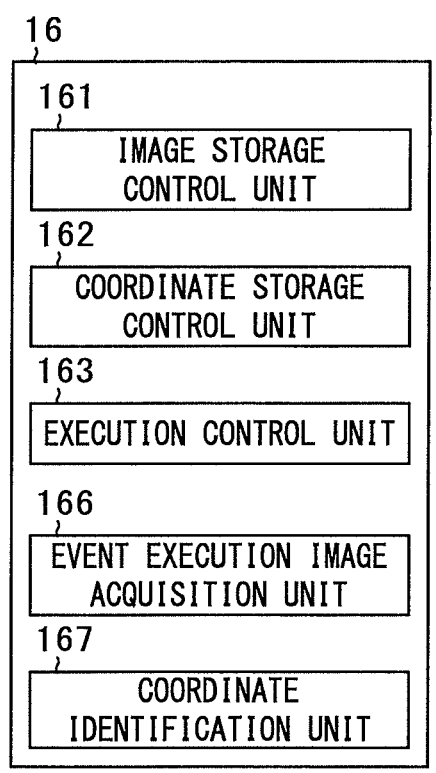
FIG. 13 is a diagram showing an example of functional blocks of a user terminal 1 according to an embodiment.

FIG. 13 is a diagram showing an example of functional blocks of the user terminal 1 according to the present embodiment. In FIG. 13, the same elements as those in FIG. 3B are denoted by the same reference numerals. As shown in FIG. 13, the system control unit 16 functions as an image storage control unit 161, a coordinate storage control unit 162, an execution control unit 163, an event execution image acquisition unit 166, a coordinate identification unit 167, and the like. The event execution image acquisition unit 166 is an example of an image acquisition means of the present invention. The coordinate identification units 167 is an example of an identification means of the present invention.

When a process corresponding to a pointing operation event is executed, the event execution image acquisition unit 166 acquires a screen shot of the current web page. When there is an image difference between a screen shot corresponding to the timing when a pointing operation is received and a screen shot at the time of executing a process corresponding to a pointing operation event, the coordinate identification unit 167 identifies on the basis of the screen shot at the time of executing a process corresponding to the pointing operation event a current position of an element indicated by a partial image, in the screen shot corresponding to the timing when the pointing operation is received, located at a position indicated by the pointed coordinates stored in the RAM 16*c*.

3-3. Operation of User Terminal

Next, an operation of the user terminal will be described with reference to FIG. 14. The pointing operation reception process is the same as that of the first embodiment.

Figure 14:
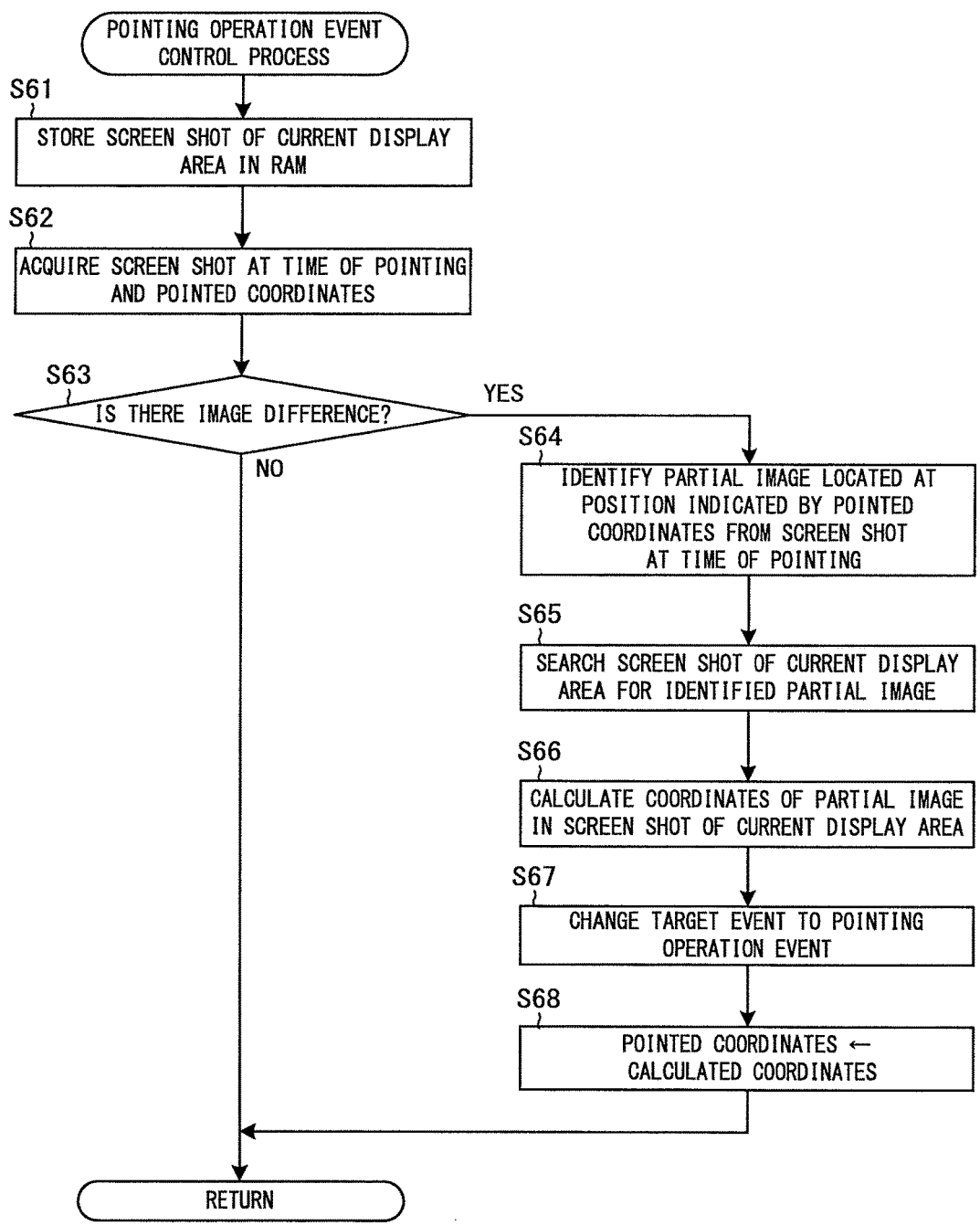
FIG. 14 is a flowchart showing a process example of a pointing operation event control process of a system control unit 16 of the user terminal 1 according to the embodiment.

FIG. 14 is a flowchart showing a process example of a pointing operation event control process of the system control unit 16 of the user terminal 1 according to the present embodiment. The pointing operation event control process is called from an event handling process execution control process. The event handling process execution control process is the same as that of the second embodiment. As shown in FIG. 14, the event execution image acquisition unit 166 acquires a screen shot of a display area of a current web page and stores the screen shot in the RAM 16*c* (step S61). Subsequently, the execution control unit 163 acquires a screen shot of the time when the pointing operation is received from the RAM 16*c* and acquires the pointed coordinates from the pointing operation event (step S62). Subsequently, the execution control unit 163 determines whether or not there is an image difference between the screen shot of the time when the pointing operation is received and the current screen shot by, for example, a known background subtraction (step S63). At this time, if the execution control unit 163 determines that there is no image difference (step S63: NO), the execution control unit 163 ends the pointing operation event control process.

On the other hand, if the execution control unit 163 determines that there is an image difference (step S63: YES), the execution control unit 163 proceeds to step S64. In step S64, the coordinate identification unit 167 identifies a partial image located in a range of a predetermined number of pixels from the pointed coordinates in the horizontal and the vertical directions from the screen shot of the time when the pointing operation is received. Subsequently, the coordinate identification unit 167 searches the screen shot of the current display area for the identified partial image by, for example, a known image matching technique (step S65). Subsequently, the coordinate identification unit 167 calculates the coordinates of the partial image in the screen shot of the current display area (step S66). Subsequently, the execution control unit 163 changes an event to be processed by the event handling process execution control process from the special event to the pointing operation event (step S67). Subsequently, the execution control unit 163 rewrites the pointed coordinates of the pointing operation event with the calculated coordinates (step S68). After completing step S68, the execution control unit 163 ends the pointing operation event control process. The ID of the event target as a parameter of the pointing operation event is not set, so that in the event handling process execution control process, the system control unit 16 causes a process corresponding to the event that is currently displayed at a position indicated by the pointed coordinates to be executed.

When the element which the user points at by a pointing operation is moved outside the display area of the web page, it is not possible to search for the partial image. In this case, the execution control unit 163 need not cause a process corresponding to the pointing operation event to be executed.

As described above, according to the present embodiment, when the system control unit 16 executes a process corresponding to the pointing operation event, the system control unit 16 acquires a screen shot of the web page. Further, when there is an image difference between the screen shot stored in the RAM 16*c* and the acquired screen shot, the system control unit 16 identifies based on the acquired screen shot a current position of the element indicated by the partial image, in the stored screen shot, located at the position indicated by the pointed coordinates. Then, the system control unit 16 causes a process corresponding to an element that is currently displayed at the identified position to be executed. On the other hand, when there is no image difference, the system control unit 16 causes a process corresponding to the element that is currently displayed at the position indicated by the pointed coordinates to be executed. Therefore, when there is no image difference, it is possible to execute a process corresponding to the element intended by the user by the same process as the conventional one. Further, the system control unit 16 need not search the DOM tree to identify the element.

In the same manner as in the second embodiment, the system control unit 16 may acquire the screen shot corresponding to the timing when the pointing operation is received from among a plurality of screen shots stored in the RAM 16*c*. Then, the system control unit 16 may determine whether or not there is an image difference between the acquired screen shot and the screen shot at the time of executing a process corresponding to the pointing operation event.

4. Fourth Embodiment

Next, a fourth embodiment will be described with reference to FIG. 15. The configuration of the information providing system S, the configuration of the user terminal 1, and the functional blocks of the system control unit 16 are the same as those of the first embodiment. In the first to the third embodiments, the information processing program of the present invention is applied to the browser. The present embodiment is an embodiment of a case in which the information processing program of the present invention is applied to a program (function enhancement program) that enhances the function of the browser. The function enhancement program is a program which a computer can execute along with the browser at the same time. The function enhancement program is an example of an information processing program of the present invention. Examples of the function enhancement program include an add-on program and a toolbar program. For example, the user terminal 1 downloads the function enhancement program from the web server 2 or the like, stores it in the storage unit 12, and installs the function enhancement program. In the system control unit 16, the CPU 16*a* executes the function enhancement program, so that the system control unit 16 functions as an image storage control unit 161, a coordinate storage control unit 162, an execution control unit 163, and the like.

The function enhancement program cannot perform processing to retrieve an event from the event queue and to control execution of a process corresponding to the event. Therefore, for example, when drawing of a web page is completed, it is necessary for the browser to notify the function enhancement program that the drawing of the web page is completed.

Figure 15A:
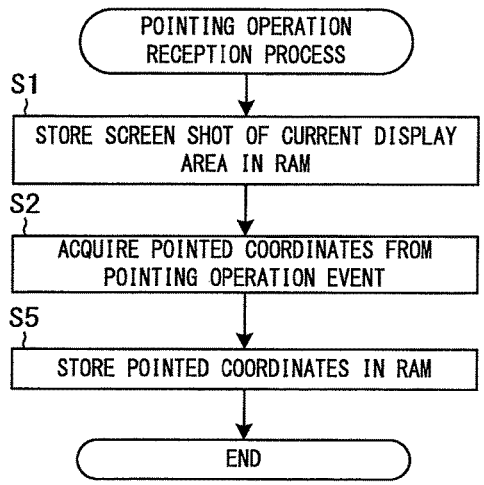
FIG. 15A is a flowchart showing a process example of a pointing operation reception process of a system control unit 16 of the user terminal 1 according to an embodiment.

FIG. 15A is a flowchart showing a process example of a pointing operation reception process of the system control unit 16 of the user terminal 1 according to the present embodiment. In FIG. 15A, the same processes as those in FIG. 4A are denoted by the same reference numerals. In the process of the function enhancement program, the image storage control unit 161 adds an event listener of a pointing operation event. Thereby, when a pointing operation is received, the pointing operation reception process is executed. As shown in FIG. 15A, the image storage control unit 161 acquires a screen shot of a display area of the current web page and stores the screen shot in the RAM 16c (step S1). Subsequently, the execution control unit 163 acquires the pointed coordinates from the pointing operation event (step S2). Subsequently, the coordinate storage control unit 162 stores the acquired pointed coordinates in the RAM 16c (step S5) and ends the pointing operation reception process. At this time, the pointing operation event is not added to the event queue.

Figure 15B:
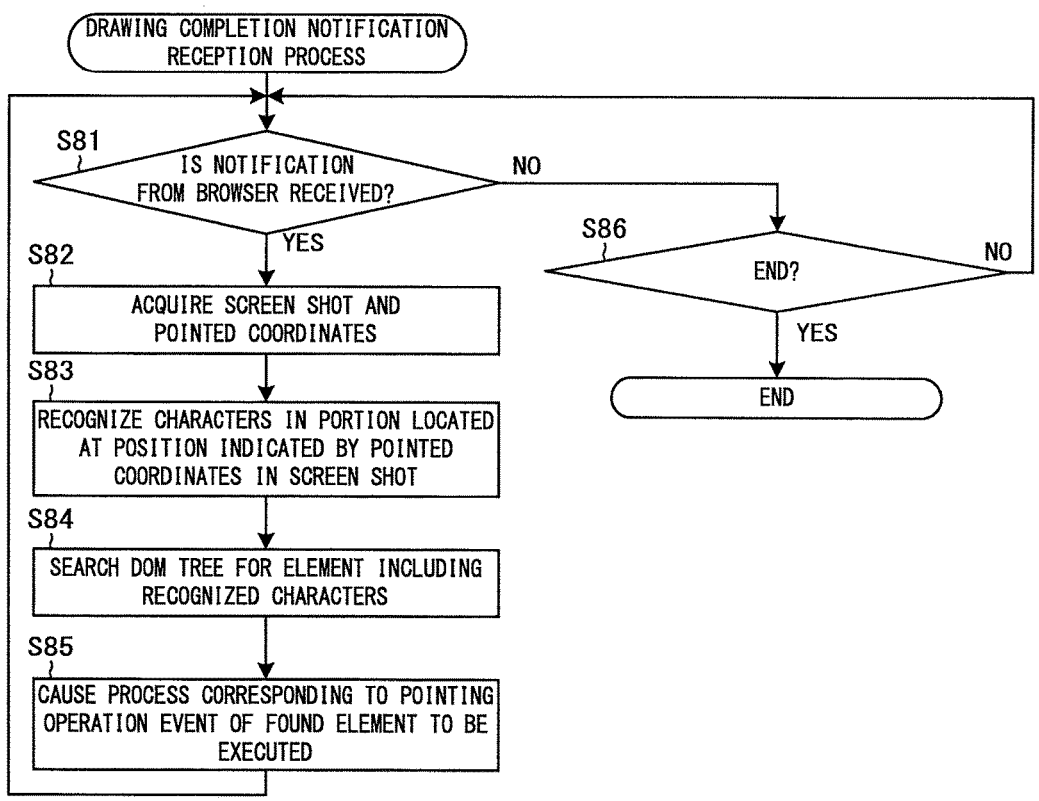
FIG. 15B is a flowchart showing a process example of a drawing completion notification reception process of the system control unit 16 of the user terminal 1 according to the embodiment.

FIG. 15B is a flowchart showing a process example of a drawing completion notification reception process of the system control unit 16 of the user terminal 1 according to the present embodiment. For example, when the function enhancement program is started together with the start of the browser, the system control unit 16 starts the drawing completion notification reception process. As shown in FIG. 15B, the execution control unit 163 determines whether or not a notification of the drawing completion of the web page is received from the browser (step S81). At this time, if the execution control unit 163 determines that the notification is received (step S81: YES), the execution control unit 163 proceeds to step S82. In step S82, the execution control unit 163 acquires the screen shot of the time when the pointing operation is received and the pointed coordinates from the RAM 16c. Subsequently, the execution control unit 163 defines a range of a predetermined number of pixels from the position indicated by the pointed coordinates in the horizontal and the vertical directions in the screen shot to be a partial image. Then, the execution control unit 163 recognizes one or more characters displayed in the partial image (step S83). Subsequently, the execution control unit 163 searches a DOM tree for a node including the recognized characters as a text, a caption, or the like. Then, the execution control unit 163 acquires an ID of an element corresponding to a found node (step S84). Subsequently, the execution control unit 163 calls an event handler of a pointing operation event of an element indicated by the acquired ID, so that the execution control unit 163 causes a process corresponding to the pointing operation event to be executed (step S85). Subsequently, the execution control unit 163 proceeds to step S81.

In step S81, if the execution control unit 163 determines that the notification is not received (step S81: NO), the execution control unit 163 proceeds to step S86. In step S86, the execution control unit 163 determines whether or not the browser is ended by a user operation. At this time, if the execution control unit 163 determines that the browser is not ended (step S86: NO), the execution control unit 163 proceeds to step S81. On the other hand, if the execution control unit 163 determines that the browser is ended (step S86: YES), the execution control unit 163 ends the drawing completion notification reception process.

As described above, when the system control unit 16 receives a notification of the completion of the drawing of the web page from the browser, the system control unit 16 causes a process corresponding to an element indicated by a partial image located at a position indicated by the pointed coordinates in the screen shot stored in the RAM 16c to be executed. Therefore, it is also possible to cause a process corresponding to an element intended by the user to be executed by the function enhancement program.

In the same manner as in the second embodiment, the system control unit 16 may acquire the screen shot corresponding to the timing when the pointing operation is received from among a plurality of screen shots stored in the RAM 16c.

In the same manner as in the third embodiment, when the system control unit 16 receives a notification of the completion of the drawing of the web page from the browser, the system control unit 16 may acquire the screen shot at the time. Then, the system control unit 16 may determine whether or not there is an image difference between the screen shot corresponding to the timing when the pointing operation is received and the screen shot at the time when the notification of the completion of the drawing is received, and may perform processing based on a determination result.

REFERENCE SIGNS LIST

1 User terminal
2 Web server
3 Information processing server
11 Communication unit
12 Storage unit
13 Operation unit
14 Display unit
15 Input/output interface
16 System control unit
16a CPU
16b ROM
16c RAM
161 Image storage control unit
162 Coordinate storage control unit
163 Execution control unit
164 Time storage control unit
165 Stored image acquisition unit
166 Event execution image acquisition unit
167 Coordinate identification unit
17 System bus
31 Communication unit
32 Storage unit
32a History DB
33 Input/output interface
34 System control unit
34a CPU
34b ROM
34c RAM
35 System bus
NW Network
S Information providing system

The invention claimed is:

1. An information processing apparatus comprising:
at least one memory operable to store program code;
at least one processor operable to read said program code and operate as instructed by said program code, said program code including:

rendering code configured to cause at least one of the at least one processor to begin drawing a web page in response to a user request;

acquisition code that, when an operation of pointing at a position of an element in the web page is received before drawing of the web page is completed, causes at least one of said at least one processors to acquire coordinates indicating the position and a screen shot of the web page, the screen shot corresponding to a timing when the operation is received; and execution control code that, when a process corresponding to the received operation is to be executed, during the drawing of the web page, causes at least one of said at least one processors to execute a process previously associated with performing the operation of the element located at the position, indicated by the coordinates acquired within the screen shot as the process corresponding to the received operation, wherein the screen shot is a graphical image of at least part of the web page currently drawn, and the web page is updated in accordance with said element.

2. The information processing apparatus according to claim 1, wherein the acquisition code causes at least one of said at least one processors to acquire a screen shot of the web page at each predetermined timing, the program code further includes:

image storage control code that causes at least one of said at least one processors to store in a storage the screen shot acquired and an acquisition time of the screen shot in association with each other, reception time storage control code that causes at least one of said at least one processors to store a reception time of the operation in the storage, completion time storage control code that when drawing of each element included in the web page is completed, causes at least one of said at least one processors to store a completion time of the drawing in the storage, and stored image acquisition code that when an elapsed time from an identified completion time to the reception time is shorter than a reference time, causes at least one of said at least one processors to acquire from the storage a screen shot corresponding to an acquisition time closest to the identified completion time among acquisition times older than the identified completion time by at least the reference time, and when the elapsed time is equal to or longer than the reference time, causes at least one of said at least one processors to acquire from the storage a screen shot corresponding to an acquisition time closest to the identified completion time among acquisition times equal to or later than the identified completion time, the identified completion time being closest to the reception time among completion times earlier than the reception time, the completion times and the acquisition times being stored in the storage; and the execution control code causes at least one of said at least one processors to execute a process previously associated with performing the operation of the element located at the position, indicated by the coordinates acquired within the screen shot.

3. The information processing apparatus according to claim 2, further comprising:

image acquisition code that causes at least one of said at least one processors to acquire a second screen shot of the web page when the process corresponding to the received operation is to be executed, wherein when there is no image difference between the screen shot acquired and the second screen shot acquired, the execution control code causes at least one of said at least one processors to execute a process of a case in which the operation is performed on an element currently displayed at a position indicated by the coordinates acquired, and when there is an image difference, the execution control code causes at least one of said at least one processors to identify, based on the second screen shot acquired, a current position of an element located at a position indicated by the coordinates acquired in the screen shot acquired, and execute a process of a case in which the operation is performed on an element that is currently displayed at the position identified.

4. The information processing apparatus according to claim 2, further comprising:

time acquisition code that causes at least one of said at least one processors to acquire a time as the reference time, the acquired time being determined based on first times and second times acquired from a history storage storing the first times and the second times as histories, the acquired time being the shortest of times that elapse from the first times to the second times, each of the first times being time at which drawing of a web page is completed, each of the second times being time at which the operation of pointing at the position of the element in the web page is received.

5. The information processing apparatus according to claim 4, further comprising:

image acquisition code that causes at least one of said at least one processors to acquire a second screen shot of the web page when the process corresponding to the received operation is to be executed, wherein when there is no image difference between the screen shot acquired and the second screen shot acquired, the execution control code causes at least one of said at least one processors to execute a process of a case in which the operation is performed on an element currently displayed at a position indicated by the coordinates acquired, and when there is an image difference, the execution control code causes at least one of said at least one processors to identify, based on the second screen shot acquired, a current position of an element located at a position indicated by the coordinates acquired in the screen shot acquired and execute a process of a case in which the operation is performed on an element that currently displayed at the position identified.

6. The information processing apparatus according to claim 1, further comprising:

image acquisition code that causes at least one of said at least one processors to acquire a second screen shot of the web page when the process corresponding to the received operation is to be executed, wherein when there is no image difference between the screen shot acquired and the second screen shot acquired, the execution control code causes at least one of said at least one processors to execute a process of a case in which the operation is performed on an element currently displayed at a position indicated by the coordinates acquired, and when there is an image difference, the execution control code causes at least one of said at least one processors to identify, based on the second screen shot acquired, a current position of an element located at the position indicated by the coordinates acquired within the screen shot, and execute a process of a case in which the operation is performed on the element currently displayed at the position identified.

7. The information processing apparatus according to claim 1, wherein the screen shot is an image of the entire webpage.

8. An information processing method performed by a computer, the method comprising:
   beginning to draw a web page in response to a user request;
   when an operation of pointing at a position of an element in the web page is received before drawing of the web page is completed, acquiring coordinates indicating the position and a screen shot of the web page, the screen shot corresponding to a timing when the operation is received; and
   when a process corresponding to the received operation is to be executed and during the drawing of the web page, causing a process that is previously associated with performing the operation of the element located at the position, indicated by the coordinates acquired within the screen shot acquired, to be executed as the process corresponding to the received operation, wherein
   the screen shot is a graphical image of at least part of the web page currently drawn, and the web page is updated in accordance with said element.

9. A non-transitory computer readable medium storing thereon an information processing program, the information processing program causing a computer to:
   begin drawing a web page in response to a user request;
   when an operation of pointing at a position of an element in the web page is received before drawing of the web page is completed, acquire coordinates indicating the position and a screen shot of the web page, the screen shot corresponding to a timing when the operation is received; and
   when a process corresponding to the received operation is to be executed and during the drawing of the web page, cause a process that is previously associated with performing the operation of an element located at the position, indicated by the coordinates acquired within the screen shot acquired, to be executed as the process corresponding to the received operation, wherein
   the screen shot is a graphical image of at least part of the web page currently drawn, and the web page is updated in accordance with said element.

10. A non-transitory computer readable medium storing thereon an information processing program which a computer can execute along with a browser at the same time, the information processing program causing the computer to:
   begin drawing a web page in response to a user request;
   when an operation of pointing at a position of an element in the web page is received before drawing of the web page is completed, acquire coordinates indicating the position and a screen shot of the web page, the screen shot corresponding to a timing when the operation is received;
   receive a notification of completion of the drawing of the web page from the browser; and
   when the notification is received and during the drawing of the web page, cause a process that is previously associated with performing the operation of an element located at the position, indicated by the coordinates acquired within the screen shot acquired, to be executed as the process corresponding to the received operation, wherein
   the screen shot is a graphical image of at least part of the web page currently drawn and the web page is updated in accordance with said element.

* * * * *